(12) United States Patent
Kim

(10) Patent No.: US 10,157,591 B2
(45) Date of Patent: Dec. 18, 2018

(54) ELECTRONIC DEVICE INCLUDING DISPLAY AND METHOD FOR CONTROLLING OPERATION OF DISPLAY IN ELECTRONIC DEVICE

(71) Applicant: Samsung Electronics Co., Ltd., Suwon-si, Gyeonggi-do (KR)

(72) Inventor: Tae-Seon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 15/291,493

(22) Filed: Oct. 12, 2016

(65) Prior Publication Data

US 2017/0140732 A1  May 18, 2017

(30) Foreign Application Priority Data

Nov. 12, 2015  (KR) .................. 10-2015-0159056

(51) Int. Cl.
*G09G 5/10* (2006.01)
*G02B 5/08* (2006.01)

(52) U.S. Cl.
CPC .............. *G09G 5/10* (2013.01); *G02B 5/08* (2013.01); *G09G 2320/0633* (2013.01); *G09G 2360/144* (2013.01)

(58) Field of Classification Search
CPC .............. G09G 5/10; G09G 2360/144; G09G 2320/0633; G02B 5/08
See application file for complete search history.

(56) References Cited

U.S. PATENT DOCUMENTS

2010/0110553 A1* 5/2010 Anderson ............... B60R 1/088
359/603
2017/0169749 A1* 6/2017 Masuda .................... G09F 9/00

FOREIGN PATENT DOCUMENTS

JP      2007-125665 A    5/2007
KR   10-2005-0105055 A   11/2005

* cited by examiner

*Primary Examiner* — Vinh T Lam
(74) *Attorney, Agent, or Firm* — Jefferson IP Law, LLP

(57) ABSTRACT

An electronic device and a method for improving the visibility of a display in an electronic device are provided. The electronic device includes a mirror configured to project or reflect light, a display panel disposed on a first surface of the mirror, and a controller, according to a mirror mode or a display mode, configured to control so as to output a control signal for adjusting an amount of external light incident on a second surface opposite to a first surface of the mirror.

17 Claims, 13 Drawing Sheets

| Table code | BLU Step | When half mirror transmittance rate is 30% | Optimum visibility external ambient light (EAL) for each BLU setting (nits=0.3*lux) ※EAL = External Ambient Light |
|---|---|---|---|
| AAAA(Off) | 0(0nits) | 0nits | Don't care |
| BBBB | 1(50nits) | 15nits | Below 17 lux (about 5.1nits) |
| CCCC | 2(100nits) | 30nits | Below 34 lux (about 10.2nits) |
| DDDD | 3(150nits) | 45nits | Below 50 lux (15nits) |
| EEEE | 4(200nits) | 60nits | Below 67 lux (about 20.1nits) |
| FFFF | 5(250nits) | 75nits | Below 83 lux (about 24.9nits) |
| NNNN | N(n*50nits) | N*15nits | Below n*17 lux (about n*5nits) |

FIG.8

| Table code | BLU Step | When half mirror transmittance rate is 30% | When applying display such as LCD having BLU (nits=0.3*lux) |
|---|---|---|---|
| AAAA(Off) | 0(0nits) | 0nits | Don't care |
| BBBB | 1(50nits) | 15nits | above 50 lux (15nits) |
| CCCC | 2(100nits) | 30nits | above 100 lux (30nits) |
| DDDD | 3(150nits) | 45nits | above 150 lux (45nits) |
| EEEE | 4(200nits) | 60nits | above 200 lux (60nits) |
| FFFF | 5(250nits) | 75nits | above 250 lux (75nits) |
| NNNN | N(n*50nits) | N*15nits | above (n*50 lux) (n*15nits) |

FIG.11

ELECTRONIC DEVICE INCLUDING DISPLAY AND METHOD FOR CONTROLLING OPERATION OF DISPLAY IN ELECTRONIC DEVICE

CROSS-REFERENCE TO RELATED APPLICATION(S)

This application claims the benefit under 35 U.S.C. § 119(a) of a Korean patent application filed on Nov. 12, 2015 in the Korean Intellectual Property Office and assigned Serial number 10-2015-0159056, the entire disclosure of which is hereby incorporated by reference.

TECHNICAL FIELD

The present disclosure relates to an electronic device including a display and a method for controlling an operation of the display in the electronic device.

BACKGROUND

There has been an increasing interest in a technology for configuring a communication network between things or devices so as to share information, and an electronic device for providing a service using such technology (for example, machine to machine (M2M) or an Internet of things (IoT) technology) has been developed.

The information sharing technology allows communication between machine to machine as well as person-to-person and person to machine, and a new value-added service can be possible through the sharing of information between all things.

In recent years, as a technology utilizing the information sharing technology, a technology (for example, a reflective display) for combining a mirror and a display and showing various information such as weather, schedule, or health information through the mirror has been developed.

The reflective display (hereinafter, referred to as a smart mirror) is a device having the mirror and a display panel combined, and the reflective display operates as the mirror when the display panel located on the back of the mirror is turned off, and when the display panel is turned on, light emitted from the display panel passes through the mirror so as to provide a display function.

The above information is presented as background information only to assist with an understanding of the present disclosure. No determination has been made, and no assertion is made, as to whether any of the above might be applicable as prior art with regard to the present disclosure.

SUMMARY

An electronic device having a smart mirror is used to prevent, by using a one-way mirror, a user, who is on the other side of the mirror, from noticing that he or she is being monitored.

However, since light reduction of the smart mirror is unavoidable due to the nature of the mirror manufacturing, the transmittance is low (a high reflectance) and the visibility of the display such as color reproduction can be reduced. For example, when a color represented by a red color on the display panel passes through the mirror, a different color (for example, dark red) other than the original color can be seen through the smart mirror.

In addition, if the transmittance is increased or the reflectance is decreased in order to increase the visibility, a reflection function of the smart mirror can be lowered. In order to ensure the transmittance rate, reflectance rate, a mirror reflection function, and the visibility, the display panel has to be provided with a high luminance.

However, since the display panel having a high luminance is an expensive equipment the smart mirror has been difficult to popularize.

Aspects of the present disclosure are to address at least the above-mentioned problems and/or disadvantages and to provide at least the advantages described below. Accordingly, an aspect of the present disclosure is to provide an electronic device having a display and a method for controlling an operation of the display in order to improve the visibility of the display in the electronic device.

In accordance with an aspect of the present disclosure, an electronic device is provided. The electronic device includes a housing, a display configured to be exposed to at least one of a first surface of the housing or a second surface opposite to the first surface, and selectively provide a first mode which reflects or transmits an external light in a deactivated state, or a second mode which displays a screen in an activated state, a processor electrically connected to the display, and a memory electrically connected to the processor, wherein the memory is configured to store instructions that, when executed by the processor, cause the processor to control to transmit, to at least one external device configured to at least one of emit or adjusting light radiated to the display, a request for emitting or transmitting a first amount of light by the at least one external device when the display provides the first mode, and to transmit, to the at least one external device, a request for emitting or transmitting a second amount of light by the at least one external device when the display provides the second mode.

In accordance with another aspect of the present disclosure, an electronic device is provided. The electronic device includes a housing, a display configured to be exposed to at least one of a first surface of the housing or a second surface opposite to the first surface, and selectively provide a first mode which reflects or transmits an external light in a deactivated state, or a second mode which displays a screen in an activated state, at least one light source being exposed to the outside of the housing and disposed adjacent to the display so as to face at least a part of the display, a processor electrically connected to the display and at least one light source, and a memory electrically connected to the processor, wherein the memory is configured to store instructions that, when executed by the processor, cause the processor to control to emit a first amount of light to the display by using the at least one light source when the display provides the first mode, and control to emit a second amount of light to the display by using the at least one light source when the display provides the second mode.

In accordance with another aspect of the present disclosure, an electronic device is provided. The electronic device includes a mirror that projects or reflects light, a display panel disposed on a first surface of the mirror, and a controller, according to a mirror mode or a display mode, that is configured to control so as to output a control signal for adjusting an amount of an external light incident on a second surface opposite to a first surface of the mirror.

In accordance with another aspect of the present disclosure, an electronic device is provided. The electronic device includes a housing, a mirror exposed to a front surface thereof through one surface of the housing, and configured to project or reflect light, a display panel disposed on a rear surface opposite to the front surface of the mirror, and a controller configured to control so as to output a control signal for adjusting an amount of an external light incident on the front surface of the mirror, according to a mirror mode or a display mode.

In accordance with another aspect of the present disclosure, a method for operating an electronic device including a mirror configured to project or reflect light, and a display panel disposed on a first surface of the mirror, is provided. The method includes switching between at least one of a mirror mode or a display mode and outputting a control signal for adjusting an amount of an external light incident on second surface opposite to a first surface of the mirror, according to the switched mode.

An electronic device according to various embodiments may adjust the amount of the light generated from internal or external light source in accordance with a function of reflecting or transmitting an external light in a deactivated state or a function of displaying a screen in an activated state, so as to secure the visibility of the display included in the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a block diagram illustrating an example of a visibility table according to a mode operation in an electronic device according to various embodiments of the present disclosure;

FIG. 11 is a block diagram illustrating an example of a visibility table according to a mode operation in an electronic device according to various embodiments of the present disclosure;

Throughout the drawings, like reference numerals will be understood to refer to like parts, components, and structures.

DETAILED DESCRIPTION

Figure 1:
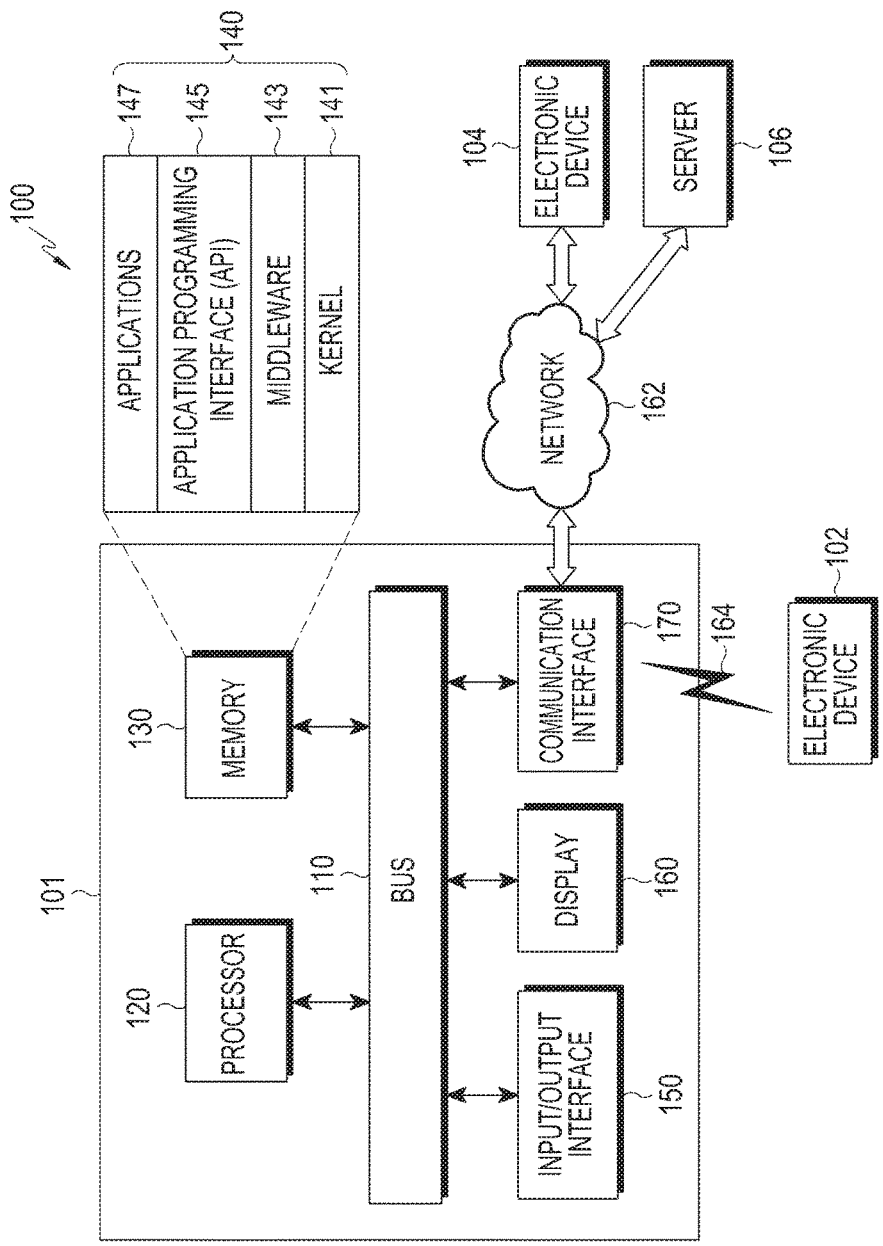
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications, equivalents of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments, the electronic device may be a home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or Internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

An electronic device 101 in a network environment 100, according to various embodiments, will be described with reference to FIG. 1. The electronic device 101 may include a bus 110, a processor 120, a memory 130, an input/output interface 150, a display 160, and a communication interface 170. In various embodiments, the electronic device 101 may omit at least one of the above elements or may further include other elements.

FIG. 1 illustrates a network environment according to various embodiments of the present disclosure.

Referring to FIG. 1, the bus 110 may include, for example, a circuit for interconnecting the elements 110 to 170 and transferring communication (e.g., control messages and/or data) between the elements.

The processor 120 may include one or more of a CPU, an AP, and a communications processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output instructions or data received from the other element(s) of the electronic device 101 to the user or the other external device.

Examples of the display 160 may include a liquid crystal display (LCD), a light-emitting diode (LED) display, an organic LED (OLED) display, a microelectromechanical systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like, for example, as a cellular communication protocol. In addition, the wireless communication may include, for example, short-range communication 164. The short-range communication 164 may include at least one of, for example, Wi-Fi, Bluetooth, near field communication (NFC), ZigBee, z-wave, or a global navigation satellite system (GNSS). The GNSS may include, for example, at least one of a GPS, a global navigation satellite system (GLONASS), a BeiDou navigation satellite system (hereinafter, referred to as "BeiDou"), Galileo, and the European global satellite-based navigation system according to a place of usage, a bandwidth, or the like. Hereinafter, the "GPS" may be used interchangeably used with the "GNSS" in the present disclosure. The wired communication may include, for example, at least one of a universal serial bus (USB), a high definition multimedia interface (HDMI), recommended standard 232 (RS-232), and a plain old telephone service (POTS). The network 162 may include at least one of a communication network such as a computer network (e.g., a local area network (LAN) or a wide area network (WAN)), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104) or the server 106 may execute the requested functions or the additional functions, and may deliver a result of the execution to the electronic device 101. The electronic device 101 may process the received result as it is or additionally to provide the requested functions or services. To this end, for example, cloud computing, distributed computing, or client-server computing technology may be used.

Hereinafter, an electronic device according to various embodiments of the present disclosure will be described with reference to the accompanying drawings.

Illumination described in various embodiments of the present disclosure may be measured by an illumination sensor inside or outside of an electronic device (for example, the electronic device 101 in FIG. 1).

In addition, a light source described in various embodiments of the present disclosure may refer to at least one among an object or a device, included in the electronic device, generating at least one light, or at least one of an object or a device, located outside, generating at least one light. The brightness of the light source may be controlled in response to a control signal of the electronic device. The light source located outside of the electronic device may perform a communication with the electronic device, and include ability for adjusting the brightness of the light, or may be integrated with a device including these functions. Further, when the type of the light source is one that generates a natural light, the brightness of the light generated by the light source can be adjusted by controlling objects (for example, smart windows, curtains, blinds or filters) for controlling the natural light by using an external device that operates in response to the control signal of the electronic device.

Figure 2:
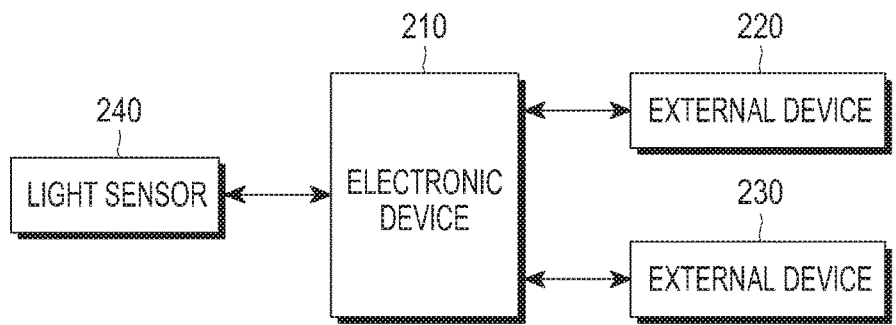
FIG. 2 is a block diagram illustrating a configuration example of an electronic device according to various embodiments of the present disclosure.

FIG. 2 is a block diagram illustrating a configuration example of an electronic device according to various embodiments of the present disclosure.

Referring to FIG. 2, according to various embodiments of the disclosure, an electronic device 210 (e.g., the electronic device 101 of FIG. 1) in a network environment may communicate with at least one of external device among an external device 220 (e.g., a bulb) including a light source for generating light incident from the outside to the electronic device 210, or an external device 240 (e.g., an illumination sensor) for detecting an external light source, or an external device 230 (such as curtains, windows, or a light source control device) for controlling a light source for generating light or for controlling so as to adjust the light (daylight) entering the house. The electronic device 210 may receive information that detects light generated from an external light source and, control so as to adjust the brightness (intensity) of the light on the display in order to provide a function (for example, at least one of a mirror function, a display function, or a partial display function) according to an operation state of the display which can selectively provide a mirror function or a display function.

The configuration of the electronic device 210 and operations for controlling an operation of the display will be described in detail with reference to the following drawings.

Figure 3:
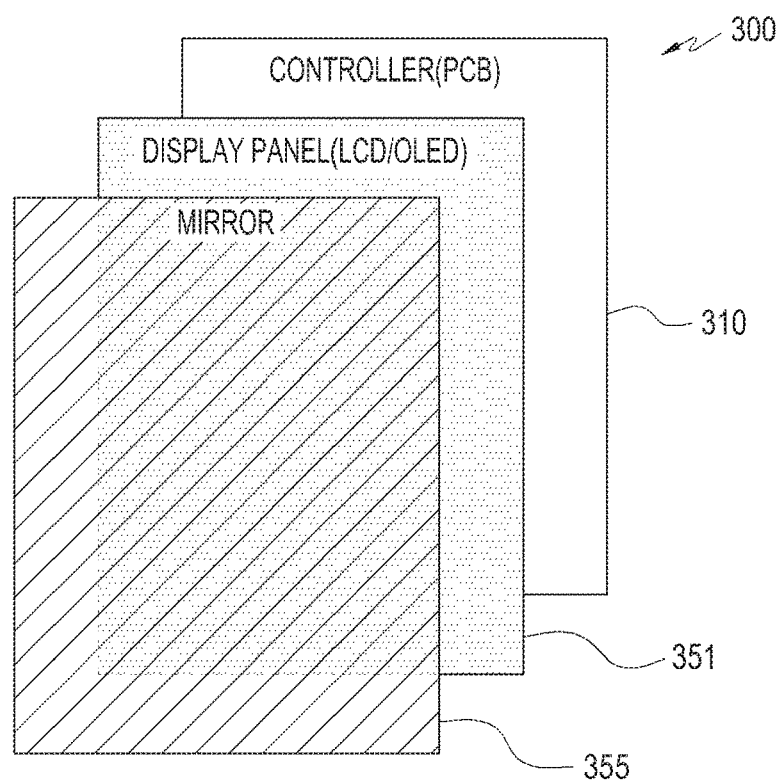
FIG. 3 is a block diagram illustrating a configuration example of an electronic device according to an embodiment of the present disclosure.

FIG. 3 is a block diagram illustrating a configuration example of an electronic device according to various embodiments of the present disclosure.

Referring to FIG. 3, according to various embodiments of the disclosure, an electronic device 300 (for example, the electronic device 101 of FIG. 1 or the electronic device 210 of FIG. 2) may be configured to further include a housing (not shown), a controller 310 (for example, a printed circuit board (PCB) type circuit), a display (not shown) including a display panel 351, and a mirror 355. According to various embodiments, the mirror 355 may be configured to be included in the display in a form of being disposed on the display panel or separately configured outside of the display. In addition, the electronic device 210 may further include a light source (not shown) capable of emitting light from inside. According to various embodiments, the electronic device 300 may be configured to include one or more light sources (not shown) being exposed to the outside of the housing and disposed adjacent to the display so as to face at least a part of the display panel 351.

According to various embodiments of the disclosure, the controller 310 may configure elements for performing an operation of the electronic device 300 in an electrically connected form, and the controller 310 is electrically connected to the display panel 351, so as to control the operation. Elements of the controller 310 may include at least one element included in the electronic device of FIG. 3 to be described later or at least one other element which is not described in FIG. 3.

According to various embodiments of the disclosure, when the display panel 351 is activated (on), the display may operate as a display function which can display a screen for providing contents by the light generated from the display panel 351 passing through the mirror. In addition, when the display panel 351 is deactivated (off), the display may operate as a mirror function capable of viewing the shape of the object by using the light that is reflected in the mirror because the rear surface of the mirror becomes dark.

The display panel 351 may be configured to at least one of an LCD, OLED, a transparent liquid crystal display, or a transparent organic light emitting diode, and located at the back of the mirror 355 so as to be electrically connected to the controller 310.

According to various embodiments of the present disclosure, the display may be exposed to a first surface of the housing and/or a second surface opposite to the first surface, and selectively provide a mirror mode (for example, the first mode) that provides a mirror function and a display mode (for example, the second mode) that provides a display function.

Further, according to various embodiments of the present disclosure, the display may simultaneously provide the mirror function and the display function under a control of the controller 310, and also provide other functions as well as the mirror function and/or display function. According to various embodiments, the display may provide the mirror function in a predetermined one area, and provide the display function in the other predetermined area at the same time. Further, according to various embodiments, the display may flexibly change the area for providing the display function in accordance with the information to be displayed.

According to various embodiments of the present disclosure, the mirror 355 may be configured by spray depositing an aluminum or chrome to the front of the display panel 351. In addition, the mirror 355 may be configured in the shape of a one-way mirror, and the one-war mirror may be configured by depositing (or coating) a metal to a polycarbonate (PC) material such as a glass or acrylate so as to have a certain amount of light transmission of at least one of 10%, 20%, or 30%. The one-way mirror can be seen to be transparent when you look at a bright place from a dark place in a case where a difference in brightness between a bright place and a dark place should be a difference of a predetermined magnitude (e.g., at least 8 to 10 times), and on the contrary, when you look at a dark place from the bright place, the one-way mirror may have the mirror function.

Figure 4:
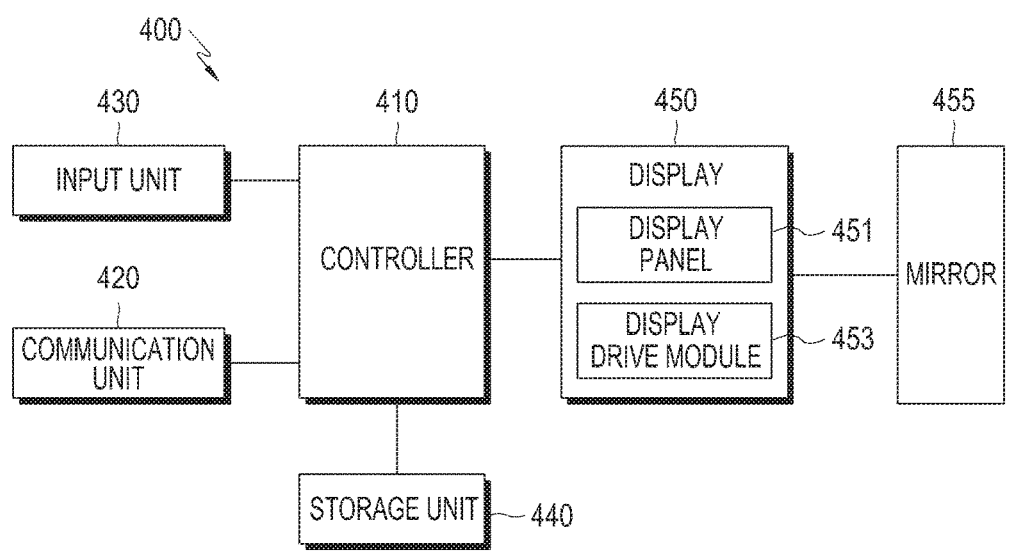
FIG. 4 is a block diagram illustrating a configuration example of an electronic device according to various embodiments of the present disclosure.

FIG. 4 is a block diagram illustrating a configuration example of an electronic device according to various embodiments of the present disclosure.

Referring to FIG. 4, according to various embodiments of the present disclosure, an electronic device 400 (for example, the electronic device 101 of FIG. 1, the electronic device 210 of FIG. 2, or the electronic device 300 of FIG. 3) may be configured to include at least one of a controller 410, a communication unit 420, an input unit 430, a storage unit 440, or a display 450.

According to various embodiments of the present disclosure, the controller 410 (for example, the processor 120 in FIG. 1) may process information according to an operation of the electronic device, or information according to the execution of a program, an application, or a function, and display the processed information on the display 450, or control so as to output the processed information through an audio module (not shown).

According to various embodiments of the present disclosure, the controller 410 may control to display various types of information (contents) in entirety or some area on the screen of the display 450.

Further, according to various embodiments of the present disclosure, the controller 410 may control the operation of the display 450. An operation of the display 450 may include, as described above, a mirror mode (for example, the first mode) which operates as a mirror function, or a display mode (for example, the second mode) which operates as a display function, and include a mode (hereinafter, referred to as partial display mode for the purpose of explanation) providing a partial display operation (or a partial mirror operation) which simultaneously provides the operation of the mirror function and the operation of the display function. The controller 410 may control to output a control signal for adjusting the amount of the external light incident on the second surface opposite to the first surface of the mirror 455, under a control of the operation. According to various embodiments, the controller may control so as to preconfigure, store, and manage a visibility table for each of the mirror mode and the display mode, and generate a control signal for adjusting the amount of light incident on the second surface based on the stored visibility table.

According to various embodiments, the controller 410 may check light intensity by an external light incident to the mirror 455, and determine whether the checked light intensity value meets a predetermined standard, that is, determine whether the checked light intensity value corresponds to a reference value included in the visibility table. When the light intensity value fails to meet the predetermined standard, the controller 410 may output a control signal for controlling the light intensity so as to check the light intensity value corresponding to the predetermined reference value when measuring the light intensity by the external light which is incident again on the mirror 455.

According to various embodiments, when receiving input information for switching a mode, the controller 410 may control so as to deactivate or activate the display panel 451 included in the display 450, according to the input information. When the input information indicates the mirror mode, the controller 410 may control the display panel 451 to be deactivated, and control the brightness of the display panel 451 to be a dark state than the external brightness, that is, switch to be the mirror mode. In addition, when the input information indicates the display mode, the controller 410 may control the display panel 451 to be activated, and control the brightness of the display panel 451 to be a bright state than the external brightness, that is, switch to be the display mode.

According to various embodiments, the controller 410 may activate, in the mirror mode state, the display panel 451 corresponding to some areas of the mirror 455 included in the display 450 and control so as to display a content on some areas. In addition, according to various embodiments, the controller 410 may set a first area of the mirror 455 to an area of the mirror mode, and control the first area to provide the mirror function, and set a second area of the mirror 455 to an area of the display mode and control so as to provide a display function.

Further, according to various embodiments of the present disclosure, the controller 410 may control to be switched to at least one of the mirror mode or the display mode based on at least one of a distance between the display 450 and the user, or situation recognition information collected for a predetermined period.

In addition, according to various embodiments of the present disclosure, the controller 410 may flexibly set the display area according to at least one of the distance between the display 450 and the user, the collected situation recognition information or information (content) to be displayed, and control to provide a display function in the set area. According to various embodiments, when the distance information measured the distance between the display 450 and the user is equal to or farther than a predetermined distance, and the user may not clearly see the contents to be displayed, the controller 410 may configure to enlarge an area that provides a display function (or reduce the area that provides the mirror function) in order to display by enlarging the size of the content that is provided based on the measured distance information. Further, according to various embodiments, when the measured distance information is closer than the predetermined distance, the controller 410 may control so as to display by reducing the size of the content to be displayed, and in this case, the controller 410 may configure to reduce an area that provides the display function (or enlarge an area that provides the mirror function). Further, according to various embodiments, the controller 410 may recognize a user's face or a user's particular gesture based on the collected situation recognition information to thereby configure the recognized position to the area that provides the mirror function, and may configure the remaining areas to the area that provides a display function. On the other hand, the controller 410 may configure the recognized position to the area that provides the display function, and configure the remaining areas to the area that provides the mirror function. In various embodiments as described above, the controller 410 may control at least one internal light according to at least one of a distance from the user, a predetermined time, or an external light so as to control the light intensity required to operate as the mirror function or display function.

According to various embodiments, when the display panel 451 included in the display 450 is a transparent display panel, the controller 410 may control so as to check the light intensity by external light incident on the adjacent area of the first surface, and check the light intensity by external light which is incident on the adjacent area of the second surface.

According to various embodiments, the controller 410 is a hardware module or a software module (e.g., an application program), which may be hardware elements (functions) or software elements (programs) including at least one of various sensors equipped with the electronic device, a data measurement module, an input/output interface, a module that manages the status or environment of the electronic device, or a communication module.

Further, according to various embodiments of the present disclosure, the controller 410 of the electronic device 400 may be at least a part of processor, and, for example, include a combination of one or two of hardware, software, or firmware. According to various embodiments, the controller 410 may omit at least some of the elements, or may be configured to further include other elements for performing an image processing operation in addition to the above elements.

In addition, according to various embodiments of the present disclosure, at least a part of configuration of the controller 410 of the electronic device 400 may include at least one processor that includes CPU/micro processing unit (MPU) by hardware, a memory on which at least one memory loading data is loaded (for example, a register and/or a random access memory (RAM)), and a part of bus that inputs/outputs at least one data to/from the processor and the memory. In addition, the controller 410 may include a predetermined program routine or program data loaded from a predetermined recording medium into the memory and processed operations by the processor, in order to perform software-defined function for the electronic device 400.

According to various embodiments of the present disclosure, the communication unit 420 of the electronic device 400 (for example, the communication interface 170 of FIG. 1) may communicate with another electronic device or an external device (for example, the electronic device 102 or 104 of FIG. 1 or the external devices 220 and 230 of FIG. 2, or the light intensity sensor 240, or the server 106), under the control of the controller 410. According to various embodiments, the communication unit 420 may transmit/receive data associated with operations executed under the control of the controller 410 to/from the external device. The communication unit 420 may connect to a network using wireless communication or wired communication via the communication interface or may communicate through a connection between devices. The wireless communication may include at least one of, for example, Wi-Fi, Bluetooth, ZigBee, z-wave, NFC, a GPS, or cellular communication (for example, LTE, LTE-A, CDMA, WCDMA, UMTS, WiBro, or GSM). The wired communication may include, for example, at least one of a USB, an HDMI, RS-232, a POTS, universal asynchronous receiver transmitter (UART), inter-integrated circuit (I2C), serial peripheral interface (SPI), or controller area network (CAN). Further, the communication unit 420 may include other well-known communication methods, or all types of communication methods to be developed next, in addition to the above-described communication method.

According to various embodiments of the present disclosure, the communication unit 420 may transmit a control signal capable of adjusting the brightness by an external light source to at least one external device (e.g., the electronic device 102 or 104 of FIG. 1, or the external device 220 and 230, or the light intensity sensor 240 of FIG. 2). In addition, the communication unit 420 may receive data including the light intensity value detected by the external device and transfer the data to the controller 410.

According to various embodiments of the present disclosure, the communication unit 420 may communicate with at least one external device (for example, the external devices 220 and 230 or light sensor 240 of FIG. 2) which can detect the external light or adjust the light intensity, and receive the sensed information (for example, the light intensity information indicating the degree of brightness of the light to be projected by the mirror of the display 450) received from the at least one external device.

Further, according to various embodiments of the present disclosure, the communication unit 420 may communicate with an external device (for example, the server 106 in FIG. 1) that provides a content, and receive the content to be displayed when the display 450 is in the status of the display function, that is, in a display mode, and transfer the received content to the controller 410.

According to various embodiments of the present disclosure, the input unit 430 of the electronic device 400 (e.g., the input/output interface 150 of FIG. 1) may transfer various information of the number and text information input from the user, various functions configuration, and a signal input relating to the function control of electronic device to the controller 410. In addition, the input unit 430 may support a user input for executing a module or an application for supporting a particular function. The input unit 430 may include at least one of a key input means such as a keyboard or a keypad, a touch input means such as a touch sensor or a touch pad, a sound input means, a camera module, an audio module, or various sensors, and may include a gesture input means. In addition, the input unit 430 may include any form of input means which is under development or can be developed for the future. In addition, according to various embodiments of the present disclosure, the input unit 430 may receive information input by the user through the touch panel or the camera on the display 450, and transfer the input information to the controller 410.

According to various embodiments of the present disclosure, the input unit 430 may transfer information relating to the user's gesture received from the camera or the various sensors to the controller 410. In addition, the input unit 430 may transfer an input signal according to the selection of at least one object (e.g., content) displayed on the screen to the controller 410.

Further, according to various embodiments of the present disclosure, the input unit 430 may receive an input signal for switching a mode from the user through the sound input device, and transfer the input signal to the controller 410. In addition, the input unit 430 may transfer a signal (for example, luminance information) detected by the sensor (e.g., a light sensor) to the controller 410.

According to various embodiments of the present disclosure, the storage unit 440 (for example, the memory 130 in FIG. 1) of the electronic device 400 may temporarily store not only a program necessary for operating functions according to various embodiments but also various data generated while executing the program. The storage unit 440 may broadly include a program area and a data area. The program area may store information related to the operation of the electronic device 400, such as an operating system (OS) for booting the electronic device 400. The data area may store transmitted/received data and generated data in accordance with various embodiments. In addition, the storage unit 440 may be configured to include at least one storage medium among a flash memory, a hard disk, a multimedia card micro type memory (e.g., secure digital (SD) or extreme digital (xD) memory), a RAM, or read only memory (ROM).

According to various embodiments of the present disclosure, the storage unit 440 may store the content received from an external device and store the light intensity information received from the external device or internal sensors. Further, according to various embodiments, the storage unit 440 may store a visibility table including configuration values for adjusting the light intensity for each mode (for example, a mirror mode, a display mode and a partial display mode). Further, according to various embodiments, the storage unit 440 may store the user's situation recognition information collected over a period of time (at least one of a user's behavior, vital signs, previous life history, or surrounding environmental information).

According to various embodiments of the present disclosure, the display 450 of the electronic device 400 (for example, some configurations of the input/output interface 150 or the display 160 of FIG. 1, or the display panel 351 of FIG. 2) may output information on operation execution result (e.g., at least one of text, an image, or a video) under the control of the controller 410.

According to various embodiments of the present disclosure, the display 450 may display an input pad (e.g., buttons) for inputting at least one of various texts, numbers, or symbols in an input window on the screen in various ways. In addition, the display 450 may display a service execution screen according to execution of various applications related to information transmission/reception. In addition, the display 450 may be configured to be included inside of the electronic device 400 or outside of the electronic device 400.

According to various embodiments of the present disclosure, the display 450 may be configured to include the display panel 451 or a display drive module 453. According to various embodiments of the present disclosure, the display 450 may be connected to the mirror 455 disposed on an area of the housing of the electronic device 400.

In addition, according to various embodiments of the present disclosure, the display 450 may be configured to include the mirror 455. According to various embodiments, the display 450 may be configured to a reflective display which is a combined form of the display panel 451 and the mirror 455.

The display panel 451 may be configured to at least one of an LCD or OLED. In addition, the display panel 451 may include at least one light source for generating light.

Further, according to various embodiments of the present disclosure, the display 450 may operate at least one mode of a mirror mode, a display mode, or a partial mirror mode (or a partial display mode) under the control of the controller 410. The display 450 may display the content to be provided to the entire area or a partial region, and when the display is switched to the display mode or the partial display mode, the display panel is turned on, and the light is transmitted by the mirror 455, so as to increase the visibility of the displayed content. Further, when the display 450 is the mirror mode, under the control of the controller 410, the display panel 451 is turned off, and the external light is reflected by the mirror 455, so as to provide a mirror function. The display 450 may display contents in the case of the mirror mode. In this case, the display content means that the other side of the mirror 455 is a dark state, that is, the brightness of the display panel 451 is the dark state. In addition, according to various embodiments, the display 450 may provide the mirror function even when the display panel 451 is not turned off, as the brightness of the display panel 451 or the brightness of internal or external lights source is adjusted by the controller 410.

Further, according to various embodiments of the present disclosure, when the display 450 of the electronic device 400 is implemented in a touch screen form, the touch screen may correspond to the touch screen of the input unit (not shown). When the display 450 is implemented along with an input unit 430 in a touch screen form, and may display various information generated according to the user's touch operation.

Furthermore, according to various embodiments, the display 450 of the electronic device may be configured to at least one among an LCD, a thin film transistor LCD (TFT-LCD), OLED, an LED, an active matrix OLED (AMO-LED), a flexible display, and a 3-dimensional display. In addition, some of the displays (or the display panel) may be configured to a transparent type or a light transmission type through which outside can be seen. The display may be configured to a transparent display type including a transparent OLED (TOLED).

In addition, according to various embodiments of the present disclosure, the electronic device 400 may further include another mounted display (e.g., an extended display or a flexible display) other than the display 450, and a display of another electronic device (for example, at least one of an external display device, a wearable device, or an external terminal device) for interacting with the electronic device 400.

According to various embodiments of the present disclosure, the electronic device 400 may be configured to further include at least one internal light source for radiating light to the mirror 455 which is included in or connected to the display 450 as well as/in addition to the light source included in the display panel 451. The internal light source (e.g., a camera light) may operate under the control of the controller 410, and discharge the amount of the light required according to the operation state of the mirror 455 under the control of the controller 410.

According to various embodiments of the present disclosure, the electronic device 400 may further include an audio module (not shown) (e.g., the input/output interface 150 of FIG. 1). The audio module may output sound and be configured to include, for example, at least one of an audio codec, a microphone (MIC), a receiver (receiver), an earphone output (EAR_L), or a speaker. Further, according to various embodiments of the present disclosure, the electronic device 400 may be configured to include a means for outputting a vibration or a means for outputting smell.

As described above, various embodiments of the present disclosure have been described for the main elements of the electronic device 400 through the electronic device 400 of FIG. 4, but in various embodiments of the present disclosure, not all of the elements illustrated through the FIG. 4 is a prerequisite, the electronic device 400 may be implemented by more elements than those illustrated, or may be implemented by fewer elements. In addition, through FIG. 4, the positions of the main elements of the electronic device 400 may be changed according to various embodiments.

An electronic device according to any one of the various embodiments includes a housing, a display configured to be exposed to a first surface of the housing and/or a second surface opposite to the first surface, and selectively provide a first mode which reflects or transmits an external light in a deactivated state, or a second mode which displays a screen in an activated state, a processor electrically connected to the display, and a memory electrically connected to the processor, wherein the memory stores instructions, when executed by the processor, for causing the processor to transmit, to at least one external device configured to emit and/or adjust light radiated to the display, a request for emitting or transmitting a first amount of light by the at least one external device when the display provides the first mode, and transmit, to the at least one external device, a request for emitting or transmitting a second amount of light by the at least one external device when the display provides the second mode.

According to various embodiments of the present disclosure, the at least one external device may include at least one of a light source, blinds, a filter, or a curtain.

In accordance with various embodiments of the present disclosure, the display may include a first area operating as the first mode, and a second area operating as the second mode.

In accordance with various embodiments of the present disclosure, the second area may be included in the first area.

In accordance with various embodiments of the present disclosure, the instructions cause the processor to determine the user's proximity to the display, and to selectively provide the first mode or the second mode based on the determination.

In accordance with various embodiments of the present disclosure, the display may include at least one fine pattern configured to reflect or transmit the external light.

In accordance with various embodiments of the present disclosure, the display may include at least one pixel configured to display a color of the screen, when viewing above the display, the fine pattern may not overlap with the at least one pixel.

An electronic device according to any one of the various embodiments includes a housing, a display configured to be exposed to a first surface of the housing and/or a second surface opposite to the first surface, and selectively provide a first mode which reflects or transmits an external light in a deactivated state, or a second mode which displays a screen in an activated state, at least one light source being exposed to the outside of the housing and disposed adjacent to the display so as to face at least a part of the display, a processor electrically connected to at least one of the display and at least one light source, and a memory electrically connected to the processor, wherein the memory may store instructions, when executed by the processor, for causing the processor to emit a first amount of light to the display by using the at least one light source when the display provides the first mode, and emit a second amount of light to the display by using the at least one light source when the display provides the second mode.

In accordance with various embodiments of the present disclosure, the display may include a first area operating as the first mode, and a second area operating as the second mode.

In accordance with various embodiments of the present disclosure, the second area may be included in the first area.

In accordance with various embodiments of the present disclosure, the instructions cause the processor to determine the user's proximity to the display, and to selectively provide the first mode or the second mode based on the determination.

In accordance with various embodiments of the present disclosure, the display may include at least one fine pattern configured to reflect or transmit the external light.

In accordance with various embodiments of the present disclosure, the display may include at least one pixel configured to display a color of the screen, when viewing above the display, the fine pattern may not overlap with the at least one pixel.

An electronic device according to any one of the various embodiments may include a mirror that projects or reflects light, a display panel located on a first surface of the mirror, and a controller, according to a mirror mode or a display mode, that controls so as to output a control signal for adjusting an amount of an external light incident on a second surface opposite to the first surface of the mirror.

In accordance with various embodiments of the present disclosure, the controller may output a control signal for adjusting the amount of light incident to the second mirror surface, based on the visibility table set for each mode of the mirror mode and the display mode.

In accordance with various embodiments of the present disclosure, the controller may check the light intensity by the incident external light, and when the checked light intensity value does not meet a predetermined standard, the controller may control the control signal to be output so as to check a light intensity value corresponding to a predetermined reference value.

In accordance with various embodiments of the present disclosure, when the display panel is a transparent display panel, the controller may check the light intensity by the external light incident on an area adjacent to the first surface, and control so as to check the light intensity by the external light incident on an area adjacent to the second surface.

In accordance with various embodiments of the present disclosure, when in the mirror mode, the controller may control the display panel to be deactivated, and control the brightness of the display panel to become darker than the brightness outside.

In accordance with various embodiments of the present disclosure, for the display mode, the controller may control the display panel to be activated, and control the brightness of the display panel to become brighter than the brightness outside.

In accordance with various embodiments of the present disclosure, the controller controls the display panel corresponding to a partial area of the mirror to be activated, in the mirror mode state, and control so as to display the content to the partial area.

According to various embodiments, the controller may configure a first area of the mirror to an area of the mirror mode, and control the first area to provide the mirror function, and configure a second area of the mirror to an area of the display mode and control so as to provide the display function.

In accordance with various embodiments of the present disclosure, the controller may control to switch to at least one of the mirror mode or the display mode according to a distance between the display and the user.

In accordance with various embodiments of the present disclosure, the controller may control to switch to at least one of the mirror mode or the display mode according to situation recognition information collected for a predetermined period.

An electronic device according to any one of the various embodiments may include a housing, the mirror being exposed front surface thereof through one surface of the housing, and projects or reflects light, a display panel disposed on a rear surface opposite to the front surface of the mirror, and a controller that controls so as to output a control signal for adjusting an amount of an external light incident on the front surface of the mirror, according to a mirror mode or a display mode.

A method for controlling an operation of a display in an electronic device as described above will be described in detail with reference to the accompanying drawings.

First, an example of operation state of the display of the electronic device according to various embodiments of the present disclosure will be described with reference to FIGS. 5A and 5B.

Figure 5A:
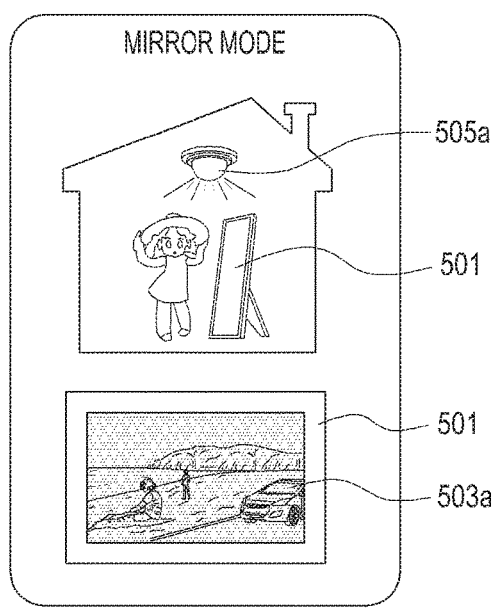
FIGS. 5A and 5B are block diagrams illustrating an example of a display operation state of an electronic device according to various embodiments of the present disclosure.
Figure 5B:
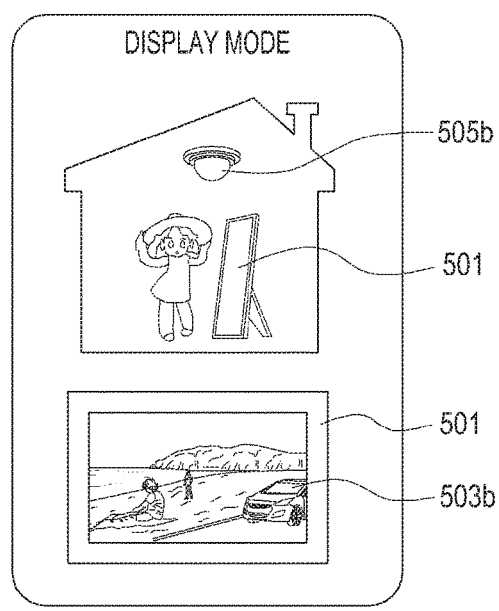

FIGS. 5A and 5B are block diagrams illustrating an example of a display operation state of an electronic device according to various embodiments of the present disclosure.

Referring to FIG. 5A, according to various embodiments of the present disclosure, when an operating state of the mirror function (e.g., a mirror mode (a first mode)) is selected according to the user's interaction, the electronic device may deactivate (off) the display panel of the display (for example, a mirror having a smart mirror function) of the electronic device, and control the light incident on the mirror to be the first amount of light. At this time, since the mirror of the display 501 may be influenced by the light emitted from at least one external light source 505a or an internal light source (not shown), that is, the external light, the electronic device may adjust the light intensity, that is, adjust the amount of light emitted from the external light source 505a or the internal light source (not shown) so that the light incident on the mirror becomes the first amount of light, in order to enhance the visibility of the object reflected in the mirror, and may output a control signal to a device capable of controlling the external light source 505a or the internal light source.

In addition, as shown in FIG. 5A, when an external light source 505a in the vicinity of the user is turned on, the electronic device may switch the display 501 to a mirror mode so as to provide a mirror function 503a by checking whether the brightness of the inside, that is, the brightness of the display panel is relatively darker than the brightness of light emitted by the external light source 505a. At this time, when the amount of light emitted from the external light source 505a, that is, the light intensity value by the light incident on the mirror is smaller than the reference value, the electronic device may transmit, to the external light source 505a, a control signal for instructing to increase the amount of external light in order to increase the reflectance of the mirror.

Referring to FIG. 5B, according to various embodiments of the present disclosure, upon receiving a request for the display mode switching from the user, the electronic device may deactivate (off) the display panel of the display (for example, a mirror having a smart mirror function), and control the mirror of the display 501 so as to operate as the display function 503b. At this time, since the mirror of the display 501 may be influenced by the light emitted from at least one external light source, in order to increase the visibility of the contents to be displayed in the mirror, the electronic device may output a control signal to adjust the amount of internal or external light so that the light incident on the mirror becomes the second amount of light.

In addition, as shown in FIG. 5B, when an external light source 505b in the vicinity of the user is turned off, the electronic device may operate the display 501 to a display mode so as to provide a display function 503b by checking whether the brightness of the inside, that is, the brightness of the display panel is relatively light (for example, 8 to 10 times lighter) than the brightness of light emitted by the external light source 505b. At this time, when the amount of light emitted from the external light source 505b, that is, the light intensity value by the light incident on the mirror is greater than the reference value, the electronic device may transmit, to an internal light source (not shown) or the external light source 505a, a control signal for instructing to reduce the amount of external light in order to increase the reflectance of the mirror.

Further, according to various embodiments, the electronic device may check the amount of light reflected or transmitted to the mirror, that is, the amount of light incident on the mirror, based on an external light intensity value received from the external device and an internal light intensity value detected from the brightness of light emitted from the internal light source. According to various embodiments, if at a place or in a state where an external light cannot be adjusted, the electronic device may control an internal light source (e.g., a camera light source) so that the light intensity value incident on the mirror becomes the light intensity value configured according to the first mode or the light intensity value configured according to the second mode, that is, may transmit a control signal so as to emit the first amount of light or the second amount of light to the internal light source. According to various embodiments of the present disclosure, the electronic device may provide a mirror function at some areas of the mirror (e.g., a first area) based on a color of the content displayed according to the selection of a partial display function, or a predetermined condition, and provide a display function at the other part of the mirror (for example, a second area). The configured condition is a condition which prevents the light from transmitting to an area of the display panel corresponding to the first area of the display, for example, it may be a condition which deactivates corresponding area by cutting off the power applied to the area of the display panel corresponding to the first area or a condition which covers the backside of the first area by using a color lowering the light transmittance. According to various embodiments, when some display areas of the displayed content are dark colors (for example, black), some display areas may provide a mirror function. Accordingly, upon analyzing areas having contents displayed therein, an area having dark content color is maintained for a predetermined time and repeatedly maintained, the electronic device may control the internal light source or the external light source so as to adjust the amount of light incident on the area.

In addition, the electronic device may be automatically switched to a partial display mode according to the user's request, situation recognition information, or an analysis result of the content that is displayed. According to various embodiments, the electronic device may analyze an area where the content is not displayed among the entire display area of the mirror, and configure at least one area of the analyzed areas as an area for providing a mirror function. For example, the electronic device may analyze remaining areas other than an area in which an actual content is displayed among the entire display area, check an area in which a content is not repetitively displayed, and change a background color to a dark color and display the background so as to provide a mirror function in the checked area, or control the display panel so as to prevent the light from transmitting the checked area.

Further, according to various embodiments, the electronic device may change an area for providing a mirror function in the entire area of the mirror based on the situation recognition information. For example, as a result of analyzing the situation recognition information, the electronic device may configure an area corresponding to the position of the user's face as a mirror mode area, in consideration of time for watching the mirror or the position of a user's face, and configure the other areas as the display mode area, thus dividing the entire area of the display according to functions so as to provide a mirror function and a display function at the same time. Further, according to various embodiments, when an event based on information to be displayed in real time occurs, the electronic device may configure some areas of the mirror to a (display mode) area for providing a display function so as to display real-time information on the configured area. When a real-time information display is finished, the electronic device may automatically provide the mirror function at the predetermined display area. In addition, according to various embodiments, in a state where the display function is provided and if a distance between a user and a display panel or the mirror is closer to a predetermined distance value, the electronic device may provide a mirror function in some areas of the mirror, and provides again a display function in the area providing the mirror function when the distance is farther or according to the user's interaction.

In accordance with various embodiments of the present disclosure, the electronic device may analyze a time or a motion at which the user moves close to the mirror based on the user's situation recognition information (e.g., a user's behavior pattern), and when the time or the movement occurs, the electronic device may determine that the user wants to receive the mirror function and control the mirror of the display to operate as the mirror function. In addition, when the user is a predetermined distance away or further from the mirror, a mode switching request is not made from the user, or an operation of a display is started, the electronic device may control the display to operate as the display function.

A method for controlling the operation of the display (for example, the display including the display panel 351 and the mirror 355 of FIG. 3, or the display inclusive of or connected to the mirror 455 of FIG. 4) so as to provide the mirror function (for example, the first mode), the display function (e.g., the second mode) or the partial display function as described above will be described in detail with reference to the accompanying drawings.

Figure 6:
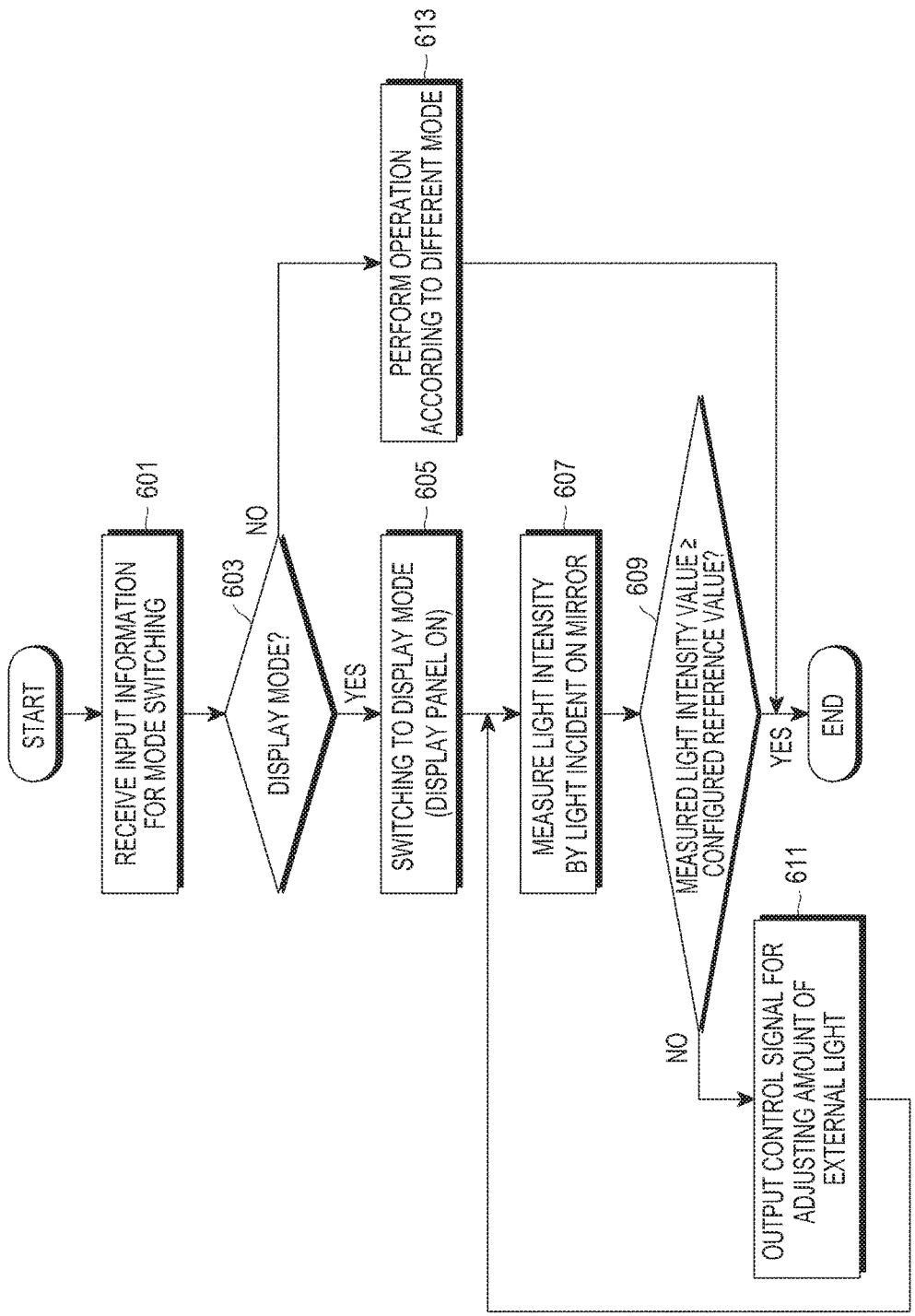
FIG. 6 is a block diagram illustrating an example of an operation of an electronic device according to various embodiments of the present disclosure.
Figure 7:
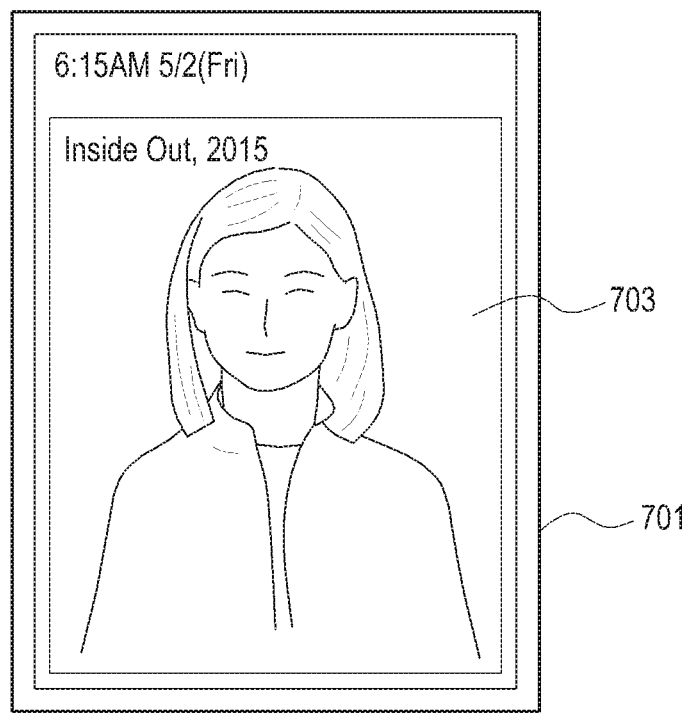
FIG. 7 is a block diagram illustrating an example of a screen in an electronic device according to various embodiments of the present disclosure.

FIG. 6 is a diagram showing an example of operation of an electronic device according to various embodiments of the present disclosure, FIG. 7 is a diagram showing a screen example of an electronic device according to various embodiments of the present disclosure, and FIG. 8 is a diagram showing an example of a visibility table according to a mode operation in an electronic device according to various embodiments.

Referring to FIG. 6, according to various embodiments of the present disclosure, in operation 601, the electronic device (e.g., the electronic device 101 of FIG. 1, the electronic device 210 of FIG. 2, or the electronic device 400 of FIG. 4) may switch an operating state according to a function of the mirror (e.g., the mirror 355 of FIG. 3, or the mirror 455 included in or connected to the display 450 of FIG. 4) of the display, i.e., may check input information according to the operating state of the display. The input information may include at least one of information directly input from a user (information based on user interaction), information sensed from a user's motion, or information received by the communication. In addition, the operation 601 may be omitted depending on the situation. For example, when a mode is automatically selected by using situation recognition information or a mode is selected according to conditions set by an operator, the electronic device may omit the operation 601.

In operation 603, the electronic device may check whether the user input information indicates the display mode (e.g., the second mode). As a result of the check, when the user input information indicates the display mode, the electronic device may perform an operation 605, and when the user input information does not indicate the display mode, the electronic device may perform an operation according to another mode in operation 613. According to various embodiments, when recognizing interaction with the user, the electronic device may perform following operations. For example, when at least one user input among voice, text, a determined gesture, or a button input indicating "show me information" is received from a user, the electronic device may check the switching to the display mode, and perform following operations. For the display mode, when the external light intensity is more than three times darker than the brightness of the panel, the visibility can be secured. The light intensity value preconfigured according to the visibility is as shown in FIG. 8.

In operation 605, the electronic device may switch a current state of the mirror of the display to the display mode, and may activate (on) the display panel. In addition, according to various embodiments, the electronic device may switch an entire area or some areas of the mirror to the display mode, and activate (on) the display panel corresponding to the entire area or some areas. As illustrated in FIG. 7, the electronic device may switch a mirror 701 to a display mode and display, on a mirror 701, a content 703 to be provided to the user.

In addition, the electronic device may check a visibility table stored corresponding to the display mode at the time of operation 605 or after the operation 605. According to various embodiments, as shown in FIG. 8, the electronic device may store and manage a visibility table which is set and tabulated ambient light intensity (external light brightness level) values having visibility for each setting value (backlight unit (BLU) step) of the BLU of the display panel in the display mode. For example, as shown in FIG. 8, when a table code is "DDDD", the electronic device may check, through a visibility table corresponding to the display mode, that a setting value of the BLU is 3 (150 nits), the transmittance of the mirror is 45 nits, and ambient light i.e., the set reference light intensity value is equal to or smaller than 50 lux (about 15 nits).

In operation 607, the electronic device may measure the intensity of the light which enters the mirror. According to various embodiments, the electronic device may measure, for example, by using at least one light sensor installed adjacent to an exposed area (for example, a first surface) of the mirror, light intensity by an external light incident to an area to provide a display function. Further, according to various embodiments, the electronic device may calculate the light intensity radiated to the mirror based on the luminance information received from at least one light sensor installed adjacent to the outside of the mirror. Further, according to various embodiments, the electronic device may calculate the intensity by the light incident on the mirror based on information acquired by communicating with at least one external electronic device for controlling light sources installed at the corresponding place (point) or at least one external electronic device capable of adjusting the light of the corresponding point.

In operation 609, when light intensity values measured by comparing the measured light intensity value and a preconfigured reference value (a reference light intensity value) included in the checked visibility table is greater than or equal to the configured reference value, the electronic device terminates the operation. On the other hand, when the measured light intensity value is smaller than the configured reference value, the electronic device may perform operation 611.

In operation 611, in order to control a measured light intensity value (brightness level of an external light) to be smaller than the reference value, the electronic device may output a control signal for controlling an amount of external light. According to various embodiments, as described above in FIG. 8, when the measured light intensity value is 300 lux, and the current setting code value is "DDDD", the electronic device should adjust the configured reference value (for example, 50 lux) low.

Thus, according to various embodiments, when the measured light intensity value is equal to or greater than the reference value, the brightness of the display panel is darker than the external brightness so that the visibility of the contents displayed in the display area will be lowered. The electronic device may pre-configure the visibility table including the reference value that has the visibility, and adjust the degree of the brightness of external light so as to be relatively darker than the display panel. According to various embodiments, the electronic device may transmit a control signal for controlling the amount of light which is emitting from a light source (for example, a camera light, or at least one light source equipment installed on a part around the mirror) installed inside, or transmit a control signal for adjusting the amount of light incident on the electronic device. For example, the electronic device may transmit a control signal for controlling the light emitted to an external electronic device which controls the light source equipment located outside, and the control signal may include simple command information which instructs to control the light amount of the light source equipment to be high or low, or may include information that indicates the amount of light to be emitted to each external electronic device. According to various embodiments, the electronic device may transmit a control signal including information indicating different pieces of information for each external electronic device, that is, the amount of light to be emitted to each external electronic device. In this case, the electronic device may measure the light intensity emitted to each area by dividing the display area of the mirror, or measure the intensity for each predetermined direction by configuring a direction for measuring the light intensity, and check the external electronic device located at points around the direction corresponding to the divided area or the measured direction, so as to transmit a different control signal to each external electronic device at each checked direction.

According to various embodiments, when communicating directly with a first bulb (bulb 1) affecting surrounding light intensity among various smart bulbs installed in a door, the electronic device may perform direct communication with the first bulb (bulb 1) so as to check the current setting level of the first bulb, or without checking, may transmit a control signal requesting for lowering the setting level by one step to the first bulb. The electronic device may receive and check again the light intensity value of the first light bulb, and when the light intensity value has not reached the reference value, the electronic device may transmit again the control signal requesting for one step lower. The electronic device may repeatedly perform the operation of setting the brightness of the first light bulb low. In addition, according to various embodiments, the electronic device may check that the light intensity is lowered by 50 lux per one step according to an operation of adjusting the light intensity of the first light bulb in a stepwise manner, and store and manage the checked light intensity adjusting information. When the light intensity adjustment of the first bulb should be performed, the electronic device may transmit a control signal including information as to how many steps (for example, 5 steps) are to be lowered based on the stored light intensity adjustment information, or information on the reference value. In addition, the electronic device may repeatedly check the light intensity value, because light intensity values can be different according to life expectancy of the smart light bulb and an installed position. The above operation of the electronic device may be applied in an operation of a mirror mode described below, and in a case of the mirror mode, the electronic device may request for increasing the setting level of the first light bulb in a stepwise manner or all at once (the light intensity value becomes higher) until the light intensity value reaches the reference value.

Further, according to various embodiments, when the light intensity value detected outside is equal to or smaller than a predetermined value, the electronic device may set the light intensity values (for example, BLU step) of the visibility table managed inside to be low and control so as to save the power consumed by the display.

Further, according to various embodiments, when the light intensity value detected outside is equal to or greater than a predetermined value, the electronic device may control so as to adjust an external light by setting the priority. For example, when positioned inside a room, the electronic device may transmit a control signal to the external device for controlling things such as curtains or blinds so as to block the light coming first from the outside.

Figure 9:
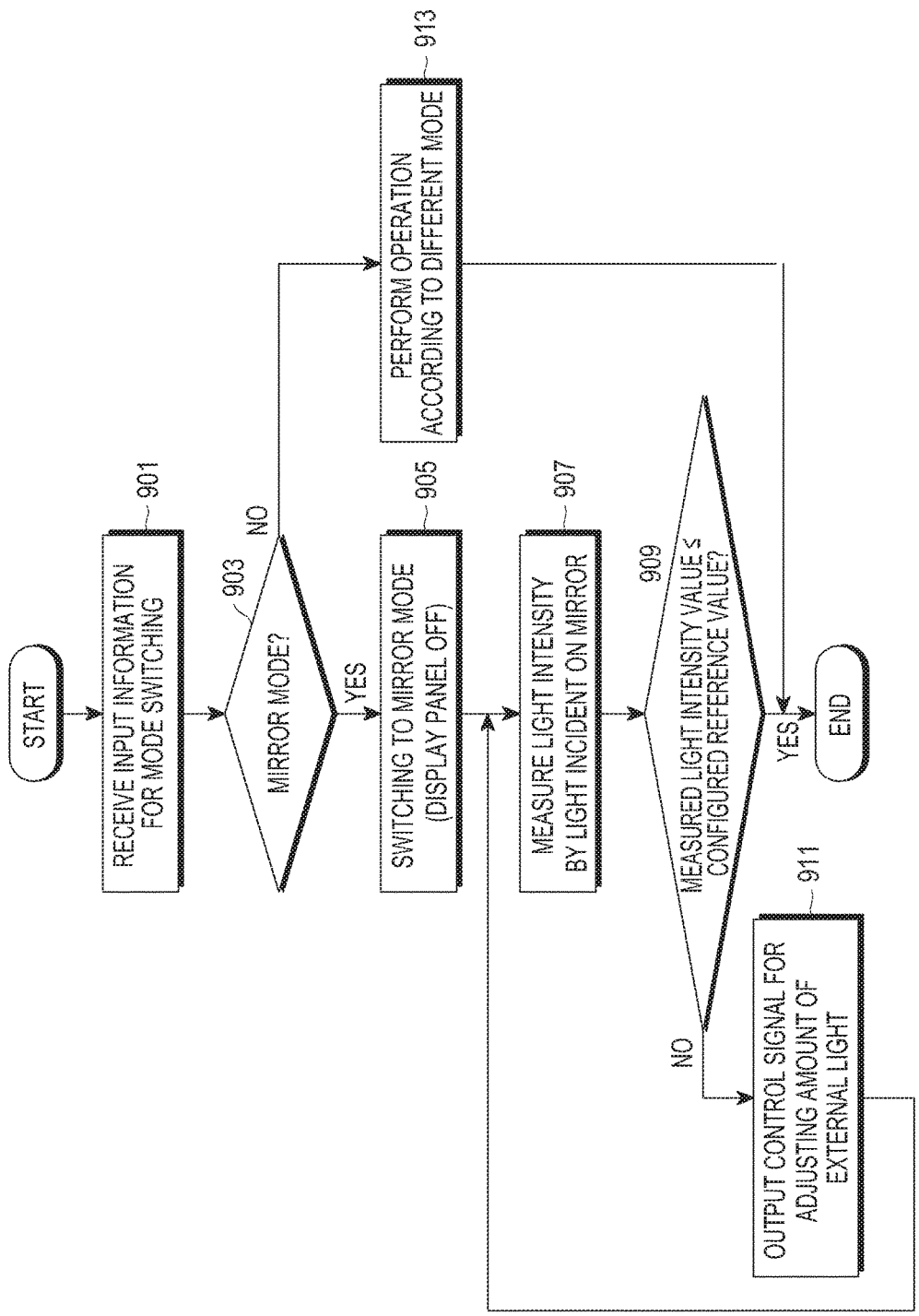
FIG. 9 is a block diagram illustrating an example of an operation of an electronic device according to various embodiments of the present disclosure.
Figure 10:
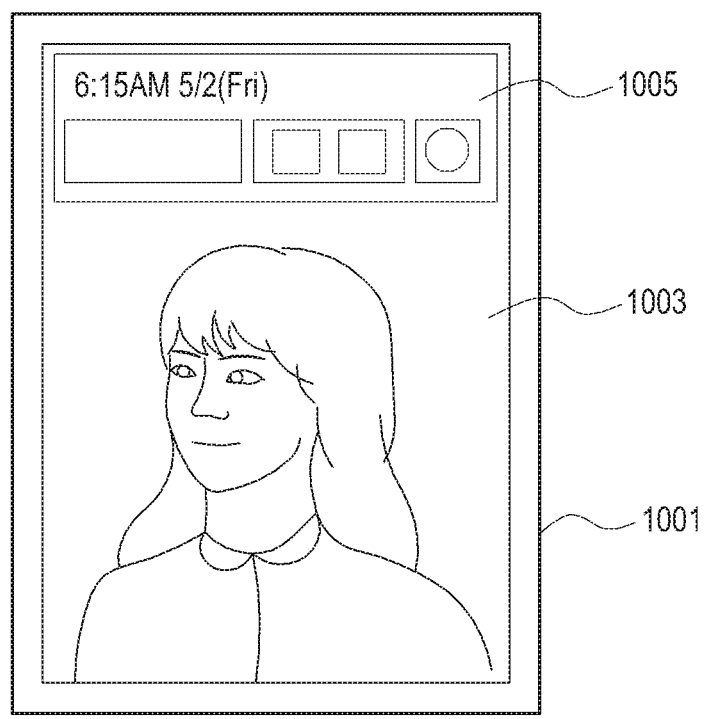
FIG. 10 is a block diagram illustrating an example of a screen in an electronic device according to various embodiments of the present disclosure.
Figure 12:
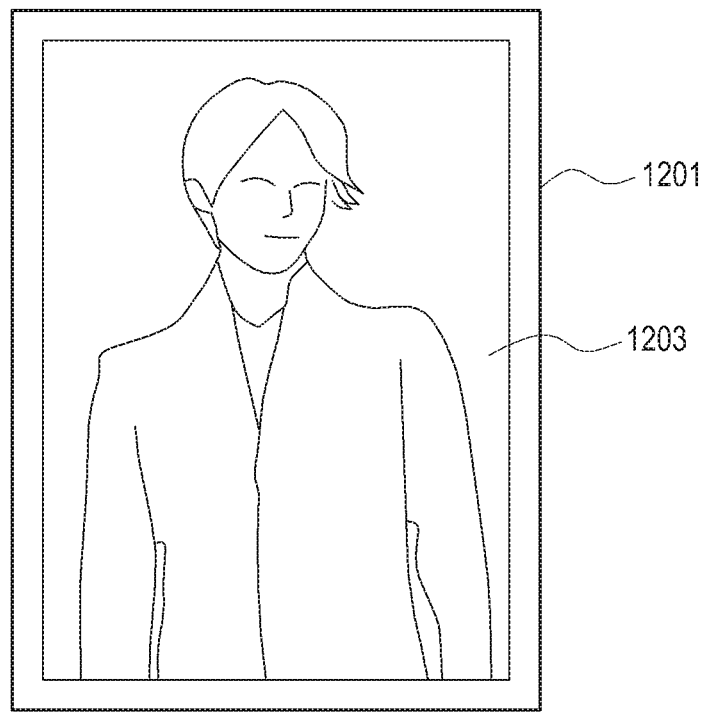
FIG. 12 is a block diagram illustrating an example of a screen in an electronic device according to various embodiments of the present disclosure.

FIG. 9 is a diagram showing an example of an operation of an electronic device according to various embodiments of the present disclosure, FIG. 10 is a diagram showing a screen example of an electronic device according to various embodiments of the present disclosure, FIG. 11 is a diagram showing an example of a visibility table according to a mode operation in an electronic device according to various embodiments of the present disclosure, and FIG. 12 is a block diagram showing an example of a screen in an electronic device according to various embodiments of the present disclosure.

Referring to FIG. 9, according to various embodiments of the present disclosure, in operation 901, the electronic device (e.g., the electronic device 101 of FIG. 1, the electronic device 210 of FIG. 2, or the electronic device 400 of FIG. 4) may receive the input information for a mode switching to the mirror of the display. The input information may include at least one of information directly input from a user, information sensed from a user's motion, or information received by using the communication. In addition, the operation 901 may be omitted depending on the situation. For example, when a mode is automatically changed by using situation recognition information or a mode is changed according to conditions set by an operator, the electronic device may omit the operation 901.

In operation 903, the electronic device may check whether the input information of the user indicates the mirror mode. As a result of the check, when the user input information indicates the mirror mode, the electronic device may perform an operation 905, and when the user input information does not indicate the mirror mode, the electronic device may perform an operation (for example, the operation of the display mode of FIG. 6) according to another mode in operation 913. According to various embodiments, when recognizing interaction with the user, the electronic device may perform following operations. For example, when at least one user input among voice, text, a determined gesture, or a button input indicating "show me a mirror" is received from a user, the electronic device may check the request of switching to the mirror mode.

In operation 905, the electronic device may switch a current state of the mirror of the display to the display mode, and may deactivate (off) the display panel. In addition, according to various embodiments, the electronic device may switch an entire area or some areas of the mirror to the mirror mode, and deactivate (off) the display panel corresponding to the entire area or some areas. As shown in FIG. 10 or 12, the electronic device may switch a mirror 1001 or 1201 to the mirror mode, so as to make the light reflected on the mirror 1001 or 1201 and a shape 1003 or 1203 of an object (such as a user) can be reflected in the mirror 1001 or 1201. In addition, as shown in FIG. 10 according to various embodiments, in a state of being switched to the mirror mode, the electronic device may operate so as to provide a display function 1005 in some areas of the mirror 1001.

In addition, the electronic device may check a visibility table stored corresponding to the display mode at the time of operation 905 or after the operation 905. According to various embodiments, as shown in FIG. 11, the electronic device may store and manage a visibility table which is set and tabulated ambient light intensity (external light brightness level) values having visibility for each setting value (BLU step) of the BLU of the display panel in the display mode. For example, as shown in FIG. 11, when a table code is "DDDD", the electronic device may check, through a visibility table corresponding to the display mode, that a setting value of the BLU is 3 (150 nits), the transmittance of the mirror is 45 nits, and ambient light i.e., the set reference light intensity value is equal to or greater than 150 lux (about 45 nits).

In operation 907, the electronic device may measure the intensity of the light which enters the mirror. According to various embodiments, the electronic device may measure, for example, by using at least one light sensor installed adjacent to an exposed area (for example, a first surface) of the mirror, light intensity by an external light incident to an area to provide a display function. Further, according to various embodiments, the electronic device may calculate the light intensity radiated to the mirror based on the luminance information received from at least one light sensor installed adjacent to outside of the mirror. Further, according to various embodiments, the electronic device may calculate the intensity by the light incident on the mirror based on information acquired by communicating with at least one external electronic device for controlling light sources installed at the corresponding place (point) or at least one external electronic device capable of adjusting the light of the corresponding point.

In operation 909, the electronic device may check whether light intensity values measured by comparing the measured light intensity value and a preconfigured reference value (a reference light intensity value) included in the checked visibility table is equal to or smaller than the configured reference value. As a result of the check, when the measured light intensity value is equal to or smaller than the configured reference value, the electronic device terminates the operation. On the other hand, when the measured light intensity value is greater than the configured reference value, the electronic device may perform an operation 911.

In operation 911, in order to control a measured light intensity value (brightness level of an external light) to be smaller than the reference value, the electronic device may output a control signal for controlling an amount of external light. According to various embodiments, as described above in FIG. 11, when the measured light intensity value is 50 lux, and the current setting code value is "DDDD", the electronic device should adjust the configured reference value (for example, 150 lux) high.

Thus, according to various embodiments, when the measured light intensity value is equal to or smaller than the reference value, the brightness of the display panel is brighter than the external brightness so that the visibility of the contents displayed in the display area will be lowered. The electronic device may pre-configure the visibility table including the reference value that has the visibility, and adjust the degree of the brightness of external light so as to be relatively brighter than the display panel. According to various embodiments, the electronic device may transmit a control signal for adjusting the amount of light which is emitting from a light source (for example, a camera light, or at least one light source installed on a part around the mirror) installed inside, or transmit a control signal for adjusting the amount of light incident on the electronic device. For example, the electronic device may transmit a control signal for controlling the light emitted to an external electronic device which controls the light source located outside, and the control signal may include simple command information which instructs to control to get high or low light amount of the light source, or may include information that indicates the amount of light to be emitted to each external electronic device. According to various embodiments, the electronic device may transmit a control signal including information indicating different pieces of information for each external electronic device, that is, the amount of light to be emitted to each external electronic device. In this case, the electronic device may measure the light intensity emitted to each area by dividing the display area of the mirror, or measure the intensity for each predetermined direction by configuring a direction for measuring the light intensity, and check the external electronic device located at points around the direction corresponding to the divided area or the measured direction, so as to transmit a different control signal to each external electronic device at each checked direction.

Further, according to various embodiments, when the light intensity value detected outside is equal to or smaller than a predetermined value, the electronic device may control so as to adjust an external light by setting the priority. For example, when positioned inside a room, the electronic device may transmit a control signal to the external device for controlling things such as curtains or blinds so as to receive the light coming first from the outside.

In addition, according to various embodiments, the electronic device may deactivate (OFF) the display panel, and maintain an audio module in an activated state so as to provide the content provided to the user as voice or provide voice information only, and transmit a control signal so as to control the external light intensity to the maximum intensity or to a user-desired state.

Further, according to various embodiments of the present disclosure, when receiving a user input indicating "show me a partial mirror", the electronic device may perform the operation of FIG. 6 in an area providing the display function, and perform the operation of FIG. 9 in an area providing the mirror function. For the partial mirror mode (or a partial display mode), since the display panel is configured to self-emitting elements without requiring a BLU such as OLED, the electronic device may set, as an area for providing the display function, a position predetermined by the user or a spare area out of a position at which the user is standing checked through the camera. The electronic device may provide a content from a predetermined area. In addition, the electronic device may provide a mirror function so as to reflect the user by OFF pixels of the display panel of an area (an area of the mirror mode) on which the user is visible.

In addition, according to various embodiments of the present disclosure, the electronic device may perform a mode switch of the display on the mirror according to the distance between the user and the display. For example, when the user is located in close proximity to the mirror, the electronic device may recognize that the user wishes to view the mirror and switch to the mirror mode. On the other hand, when the user is looking at the mirror at a predetermined distance or more apart from the mirror, the electronic device may recognize that the user wants to receive information through the mirror so as to switch to the display mode and provide information the user wants through the mirror. The content shown in the display mode may be contents stored in the electronic device or contents provided through mirroring from the external device.

Further, according to various embodiments of the present disclosure, an electronic device (for example, the electronic device 101 of FIG. 1, the electronic device 210 of FIG. 2, or the electronic device 400 of FIG. 4) may collect and manage information recognizing the situation such as the user's behavior pattern or surrounding environment information, etc., and database and store the collected information (situation recognition information).

According to various embodiments, the electronic device may perform a mode switching of the display on the mirror based on the stored and managed situation recognition information in consideration of the user's behavior pattern or the surrounding environment.

Further, according to various embodiments of the present disclosure, when interworking with an external display device having a smart mirror function, the electronic devices may perform operations shown in FIGS. 6 and 9 as described above in order to increase the visibility of the external display device. In this case, when receiving input information requesting for the mode switching, the electronic device may transmit, to an external display device, the input information requesting for the mode switching, or transmit a control signal for adjusting an interior light source of the external display device.

Further, according to various embodiments of the present disclosure, when the display panel of the display of the electronic device is a transparent display panel, the light intensity of both the front surface of the display panel, that is, the mirror deposited surface, and the rear surface of the display panel, that is, the surface opposite to the mirror deposited surface are measured so as to adjust the light intensity.

Further, according to various embodiments of the present disclosure, when interaction between an external electronic devices (e.g., a wearable device, a terminal, etc.) (e.g., the external electronic device 102 or 103 of FIG. 1) occurs, or an event occurs, the electronic device switches to the display mode so as to display a function according to the interaction, for example, information transmitted and received to and from the external electronic devices, and information according to the occurrence of the event. Accordingly, the user may check information that is shown by transmitting through the mirror. In addition, for the information on which the visibility is not important, the electronic device may output the information as the sound through an audio module in the mirror mode, or display the information by adjusting the light intensity of a partial area.

According to any one of the various embodiments, a method for operating an electronic device including a mirror which projects or reflects light, and a display panel placed on a first surface of the mirror is provided. The method may include (operations of) switching to at least one of a mirror mode or a display mode, and outputting a control signal for adjusting an amount of an external light incident on second surface of the mirror opposite to the first surface, according to the switched mode.

According to various embodiments of the present disclosure, the outputting of the control signal may include checking the light intensity by the incident external light, and when the checked light intensity value fails to meet a predetermined standard, outputting the control signal including information for adjusting the amount of the emitted light so as to check the light intensity value corresponding to a predetermined reference value.

According to various embodiments of the present disclosure, the outputting of the control signal may further include when the display panel is a transparent display panel, controlling at least one of an area adjacent to the first surface of the display panel or an area adjacent to the second surface of the display panel so as to determine the light intensity by the incident external light.

According to various embodiments of the present disclosure, the switching to at least one of the mirror mode or the display mode operation may include deactivating the display panel, and switching to the mirror mode so that the brightness of the display panel is darker than the external brightness.

According to various embodiments of the present disclosure, the switching to at least one of the mirror mode or the display mode operation may include: activating the display panel, and switching to the display mode so that the brightness of the display panel is brighter than the external brightness.

According to various embodiments of the present disclosure, the method may further include providing the functionality of a different mode on a partial area of the mirror in a state where the mirror is switched to either one of two modes.

According to various embodiments of the present disclosure, the providing of the functionality of the different mode on the partial area of the mirror may include activating the display panel corresponding to the partial area of the mirror in a state of being switched to the mirror mode, and displaying a content on the partial area.

According to various embodiments of the present disclosure, the switching to at least one of the mirror mode or display mode may switch to at least one of the mirror mode or the display mode according to the distance between the mirror and the user mirror mode.

According to various embodiments of the present disclosure, the switching to at least one of the mirror mode or display mode may switch to at least one of the mirror mode or the display mode based on situation recognition information collected for a predetermined period.

A more detailed operation procedure for improving the visibility of the display, according to the operation procedure of the electronic device according to various embodiments of the present disclosure as described above, will be described with reference to the accompanying drawings.

Figure 13:
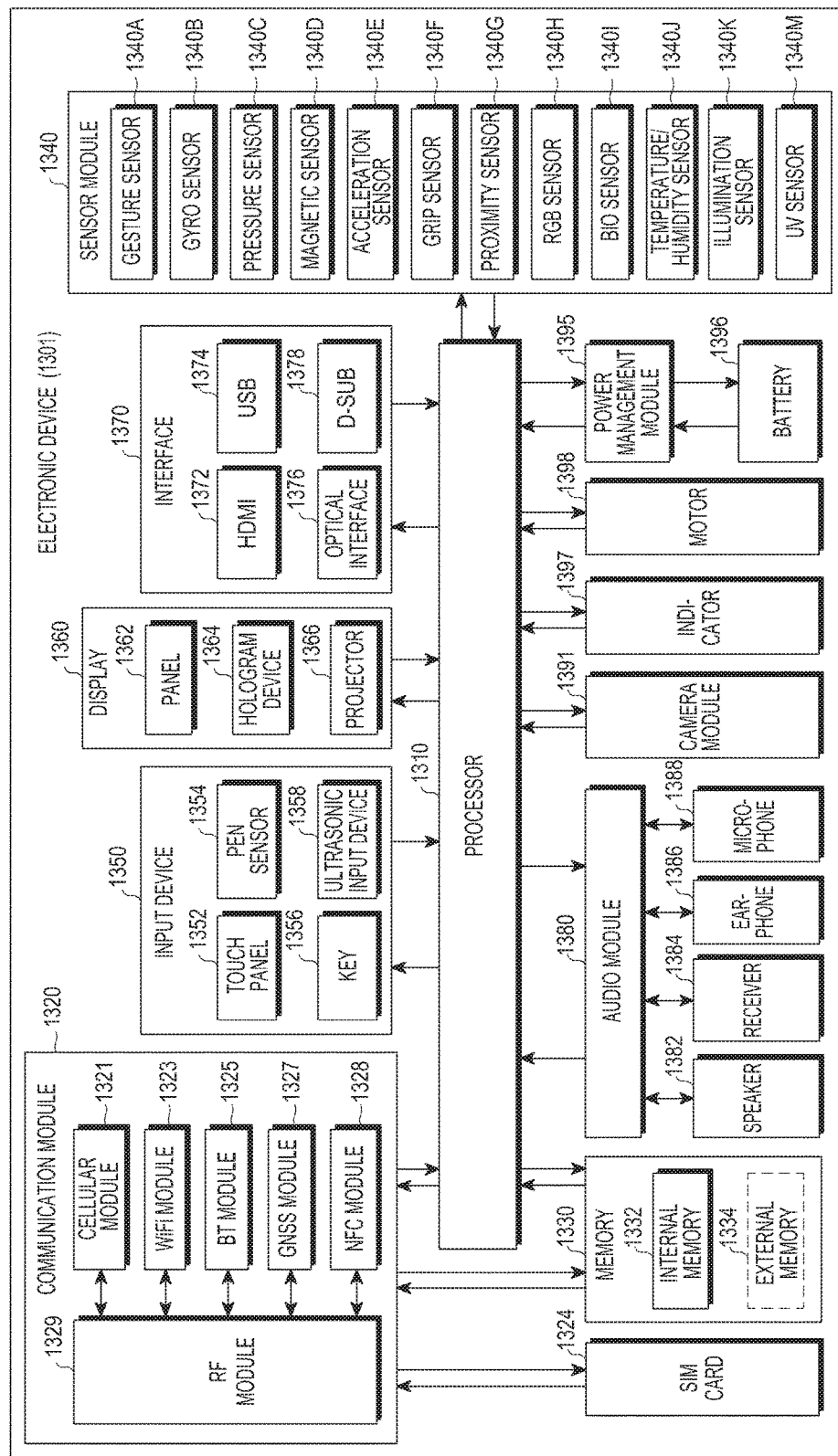
FIG. 13 is a block diagram of an electronic device according to various embodiments.

FIG. 13 is a block diagram of an electronic device 1301 according to various embodiments of the present disclosure. For example, the electronic device 1301 may include the whole or part of the electronic device 101 illustrated in FIG. 1.

Referring to FIG. 13, the electronic device 1301 may include at least one processor (e.g., application processor) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may control a plurality of hardware or software components connected to the processor 1310 by driving an operating system or an application program and perform processing of various pieces of data and calculations. The processor 1310 may be implemented by, for example, a system on chip (SoC). According to an embodiment, the processor 1310 may further include a graphics processing unit (GPU) and/or an image signal processor. The AP 1310 may include at least some (e.g., a cellular module 1321) of the elements illustrated in FIG. 13. The processor 1310 may load, into a volatile memory, instructions or data received from at least one (e.g., a non-volatile memory) of the other elements and may process the loaded instructions or data, and may store various data in a non-volatile memory.

The communication module 1320 may have a configuration equal to or similar to that of the communication interface 170 of FIG. 1. The communication module 1320 may include, for example, a cellular module 1321, a Wi-Fi module 1323, a Bluetooth module 1325, a GNSS module 1327 (e.g., a GPS module, a GLONASS module, a BeiDou module, or a Galileo module), an NFC module 1328, and a radio frequency (RF) module 1329.

The cellular module 1321 may provide a voice call, image call, a text message service, or an Internet service through, for example, a communication network. According to an embodiment, the cellular module 1321 may distinguish between and authenticate electronic devices 1301 within a communication network using a SIM (for example, the SIM card 1324). According to an embodiment of the present disclosure, the cellular module 1321 may perform at least some of the functions that the processor 1310 may provide. According to an embodiment of the present disclosure, the cellular module 1321 may include a communication processor.

The Wi-Fi module 1323, the Bluetooth module 1325, the GNSS module 1327, or the NFC module 1328 may include, for example, a processor that processes data transmitted and received through the corresponding module. According to an embodiment of the present disclosure, at least some (e.g., two or more) of the cellular module 1321, the Wi-Fi module 1323, the Bluetooth module 1325, the GNSS module 1327, and the NFC module 1328 may be included in one integrated chip (IC) or IC package.

The RF module 1329 may transmit/receive, for example, a communication signal (for example, an RF signal). The RF module 1329 may include, for example, a transceiver, a power amp module (PAM), a frequency filter, a low noise amplifier (LNA), or an antenna. According to an embodiment of the present disclosure, at least one of the cellular module 1321, the Wi-Fi module 1323, the Bluetooth module 1325, the GNSS module 1327, and the NFC module 1328 may transmit and receive RF signals through a separate RF module.

The SIM 1324 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 1330 (for example, the memory 130) may include, for example, an internal memory 1332 or an external memory 1334. The internal memory 1332 may include at least one of, for example, a volatile memory (for example, a dynamic RAM (DRAM), a static RAM (SRAM), a synchronous DRAM (SDRAM), and the like) and a non-volatile memory (for example, a one time programmable ROM (OTPROM), a PROM, an erasable and programmable ROM (EPROM), an electrically erasable and programmable ROM (EEPROM), a flash memory (for example, a NAND flash memory or a NOR flash memory), a hard drive, or a solid state drive (SSD).

An external memory 1334 may further include a flash drive, for example, a compact flash (CF), an SD, a micro-SD, a mini-SD, an xD, a memory stick, or the like. The external memory 1334 may be functionally and/or physically connected to the electronic device 1301 through various interfaces.

The sensor module 1340 may measure a physical quantity or detect an operation state of the electronic device 1301, and may convert the measured or detected information into an electrical signal. The sensor module 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a biometric sensor 1340I, a temperature/humidity sensor 1340J, a light sensor 1340K, and an ultraviolet (UV) sensor 1340M. Additionally or selectively, the sensor module 1340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling one or more sensors included therein. In various embodiments of the present disclosure, an electronic device 1301 may further include a processor configured to control the sensor module 1340 as a part of or separately from the processor 1310, and may control the sensor module 1340 while the processor 1310 is in a sleep state.

The input device 1350 may include, for example, a touch panel 1352, a (digital) pen sensor 1354, a key 1356, or an ultrasonic input device 1358. The touch panel 1352 may use at least one of, for example, a capacitive scheme, a resistive scheme, an infrared scheme, and an ultrasonic scheme. Further, the touch panel 1352 may further include a control circuit. The touch panel 1352 may further include a tactile layer and provide a tactile reaction to the user.

The (digital) pen sensor 1354 may include, for example, a recognition sheet which is a part of the touch panel or is separated from the touch panel. The key 1356 may include, for example, a physical button, an optical key or a keypad. The ultrasonic input device 1358 may detect ultrasonic wave generated by an input tool through a microphone (for example, the microphone 1388) and identify data corresponding to the detected ultrasonic waves.

The display 1360 (for example, the display 160) may include a panel 1362, a hologram device 1364 or a projector 1366. The panel 1362 may include a configuration identical or similar to that of the display 160 illustrated in FIG. 1. The panel 1362 may be implemented to be, for example, flexible, transparent, or wearable. The panel 1362 and the touch panel 1352 may be implemented as one module. The hologram 1364 may show a three dimensional image in the air by using an interference of light. The projector 1366 may display an image by projecting light onto a screen. The screen may be located, for example, in the interior of or on the exterior of the electronic device 1301. According to an embodiment, the display 1360 may further include a control circuit for controlling the panel 1362, the hologram device 1364, or the projector 1366.

The interface 1370 may include, for example, an HDMI 1372, a USB 1374, an optical interface 1376, or a D-sub-miniature (D-sub) 1378. The interface 1370 may be included in, for example, the communication interface 170 illustrated in FIG. 1. Additionally or selectively, the interface 1370 may include, for example, a mobile high-definition link (MHL) interface, an SD card/multi-media card (MMC) interface, or an infrared data association (IrDA) standard interface.

The audio module 1380 may bilaterally convert, for example, a sound and an electrical signal. At least some elements of the audio module 1380 may be included in, for example, the input/output interface 150 illustrated in FIG. 1. The audio module 1380 may process sound information which is input or output through, for example, a speaker 1382, a receiver 1384, earphones 1386, the microphone 1388 or the like.

The camera module 1391 is a device which may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 1395 may manage, for example, the power of the electronic device 1301. According to an embodiment, the power management module 1395 may include a power management IC (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 1396, and a voltage, a current, or a temperature during the charging. The battery 1396 may include, for example, a rechargeable battery or a solar battery.

The indicator 1397 may indicate a particular state (e.g., a booting state, a message state, a charging state, or the like) of the electronic device 1301 or a part (e.g., the processor 1310) of the electronic device 1301. The motor 1398 may convert an electrical signal into mechanical vibration, and may generate vibration, a haptic effect, or the like. Although not illustrated, the electronic device 1301 may include a processing unit (e.g., a GPU) for supporting a mobile TV. The processing unit for supporting mobile TV may, for example, process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 14:
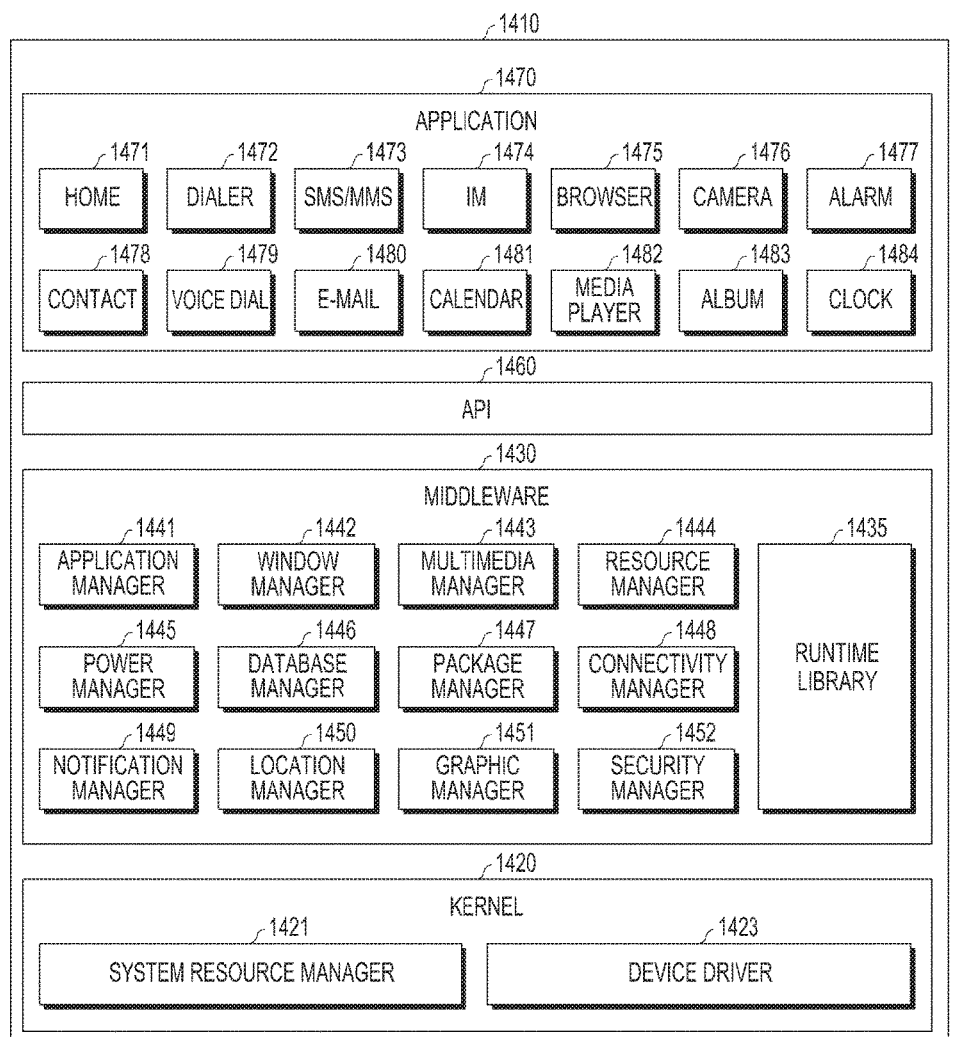
FIG. 14 is a block diagram of a program module according to various embodiments of the present disclosure.

FIG. 14 is a block diagram of a program module according to various embodiments of the present disclosure. According to an embodiment, the program module 1410 (for example, the program 140) may include an OS for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

Referring to FIG. 14, the program module 1410 may include a kernel 1420, middleware 1430, an API 1460, and/or an application 1470. At least some of the program module 1410 may be preloaded on the electronic device, or may be downloaded from an external electronic device (for example, the electronic device 102 or 104, or the server 106).

The kernel 1420 (for example, the kernel 141) may include, for example, a system resource manager 1421 and/or a device driver 1423. The system resource manager 1421 may control, assign, or collect system resources. According to an embodiment, the system resource manager 1421 may include a process manager, a memory manager, or a file system manager. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 may, for example, provide a function commonly required by the applications 1470, or may provide various functions to the applications 1470 through the API 1460 so that the applications 1470 can efficiently use limited system resources within the electronic device. According to an embodiment of the present disclosure, the middleware 1430 (e.g., the middleware 143) may include, for example, at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 may include, for example, a library module that a compiler uses in order to add new functions through a programming language while the applications 1470 are executed. The runtime library 1435 may perform input/output management, memory management, or a function for an arithmetic function.

The application manager 1441 may, for example, manage a life cycle of at least one of the applications 1470. The window manager 1442 may manage graphical user interface (GUI) resources used on a screen. The multimedia manager 1443 may identify formats required for the reproduction of various media files and encode or decode a media file using a codec suitable for the corresponding format. The resource manager 1444 may manage resources of at least one of the applications 1470, such as a source code, a memory, and a storage space.

The power manager 1445 may operate together with, for example, a basic input/output system (BIOS) to manage a battery or power and may provide power information required for the operation of the electronic device. The database manager 1446 may generate, search, or change a database to be used in at least one of the applications 1470. The package manager 1447 may manage the installation or the updating of an application distributed in the form of a package file.

The connectivity manager 1448 may manage a wireless connection such as, for example, Wi-Fi or Bluetooth. The notification manager 1449 may display or notify of an event, such as an arrival message, an appointment, a proximity notification, and the like, in such a manner that a user is not disturbed. The location manager 1450 may manage location information of the electronic device. The graphic manager 1451 may manage a graphic effect to be provided to a user and a user interface relating to the graphic effect. The security manager 1452 may provide all security functions required for system security or user authentication. According to an embodiment of the present disclosure, when the electronic device (for example, the electronic device 101) has a telephone call function, the middleware 1430 may further include a telephony manager for managing a voice call function or a video call function of the electronic device.

The middleware 1430 may include a middleware module that forms combinations of various functions of the above described elements. The middleware 1430 may provide specialized modules according to types of operating systems in order to provide differentiated functions. Furthermore, the middleware 1430 may dynamically remove some of the existing elements, or may add new elements.

The API 1460 (e.g., the API 145) is, for example, a set of API programming functions, and may be provided with a different configuration according to an OS. For example, in the case of Android or iOS, one API set may be provided to each platform, and in the case of Tizen, two or more API sets may be provided to each platform.

The applications 1470 (e.g., the application programs 147) may include, for example, one or more applications that can provide functions, such as home 1471, dialer 1472, short message service (SMS)/multimedia message service (MMS) 1473, instant message (IM) 1474, browser 1475, camera 1476, alarm 1477, contacts 1478, voice dial 1479, email 1480, calendar 1481, media player 1482, album 1483, clock 1484, health care (e.g., measure exercise quantity or blood sugar), or environment information (e.g., atmospheric pressure, humidity, or temperature information).

According to an embodiment of the present disclosure, the applications 1470 may include an application (hereinafter, referred to as an "information exchange application" for convenience of description) supporting information exchange between the electronic device (e.g., the electronic device 101) and an external electronic device (e.g., the electronic device 102 or 104). The application associated with exchanging information may include, for example, a notification relay application for notifying an external electronic device of certain information or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, the external electronic device and provide the received notification information to the user.

For example, the device management application may manage (for example, install, delete, or update) at least one function of an external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 1470 may include applications (for example, a health care application of a mobile medical appliance or the like) designated according to attributes of the external electronic device 102 or 104. According to an embodiment of the present disclosure, the application 1470 may include an application received from the external electronic device (e.g., the server 106, or the electronic device 102 or 104). According to an embodiment, the applications 1470 may include a preloaded application or a third party application which can be downloaded from the server. Names of the elements of the program module 1410, according to the above-described embodiments of the present disclosure, may change depending on the type of OS.

According to various embodiments of the present disclosure, at least some of the program module 1410 may be implemented in software, firmware, hardware, or a combination of two or more thereof. At least some of the program module 1410 may be implemented (e.g., executed) by, for example, the processor (e.g., the controller 310). At least some of the program module 1410 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an ASIC chip, a field-programmable gate array (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 120), may cause the one or more processors to execute the function corresponding to the instruction. The non-transitory computer-readable storage medium may be, for example, the memory 130.

The non-transitory computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, there is provided is a non-transitory computer-readable recording medium having a program executed on a computer, wherein, when executed by a processor of an electronic device including a mirror and a display panel configured to project or reflect light, the program includes executable instructions configured to cause the processor to control to switch to at least one of a mirror mode or a display mode, and output, according to the switched mode, a control signal for controlling an amount of external light incident on a second surface opposite to a first surface of the mirror.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a housing;
a display configured to:
  be exposed to at least one of a first surface of the housing or a second surface opposite to the first surface, and
  selectively provide a first mode which reflects or transmits light emitted by at least one external device in a deactivated state, or a second mode which displays a screen in an activated state;
a processor electrically connected to the display; and
a memory electrically connected to the processor,
wherein the memory is configured to store instructions that, when executed by the processor, cause the processor to control to:
  transmit, to at least one external device configured to at least one of emit or adjust light radiated to the display, a request for emitting or transmitting a first amount of light by the at least one external device when the display provides the first mode, and
  transmit, to the at least one external device, a request for emitting or transmitting a second amount of light by the at least one external device when the display provides the second mode,
wherein the display comprises:
  a mirror configured to reflect or transmit light incident on the first surface from the at least one external device, and mirror shapes of external objects, wherein a front surface of the mirror is exposed to the first surface; and a display panel disposed on or over a surface of the mirror which is opposite to the front surface of the mirror.

2. The electronic device of claim 1, wherein the processor is configured to:

output a control signal for adjusting an amount of light incident on the front surface of the mirror to the at least one external device based on a visibility table configured for each of the first mode and the second mode.

3. The electronic device of claim 1, wherein the instructions, when executed by the processor, cause the processor to control to:

determine a user's proximity to the display; and
based on the determination, selectively provide the first mode or the second mode.

4. An electronic device comprising:

a housing;
a display configured to:
  be exposed to at least one of a first surface of the housing or a second surface opposite to the first surface, and
  selectively provide a first mode which reflects or transmits an external light in a deactivated state, or a second mode which displays a screen in an activated state;
at least one light source exposed to an outside of the housing and disposed adjacent to the display so as to face at least a part of the display,
wherein the display comprises:
  a mirror configured to reflect or transmit an external light incident on the first surface from the at least one light source, and mirror shapes of external objects, wherein a front surface of the mirror is exposed to the first surface; and
  a display panel disposed on or over a surface of the mirror which is opposite to the front surface of the mirror;
a processor electrically connected to the display and the at least one light source; and
a memory electrically connected to the processor,
wherein the memory is configured to store instructions that, when executed by the processor, cause the processor to control to:
  emit a first amount of light to the front surface of the mirror by the at least one light source when the display provides the first mode, and
  emit a second amount of light to the display by the at least one light source when the display provides the second mode.

5. The electronic device of claim 4, wherein the processor is configured to output a control signal for adjusting an amount of light to be emitted by the at least one light source based on a visibility table configured for each of the first mode and the second mode.

6. The electronic device of claim 4, wherein the processor is configured to:

detect light intensity of light emitted by the at least one light source on the surface of the mirror; and
output a control signal for adjusting an amount of light be emitted by the at least one light source based on the detected light intensity.

7. The electronic device of claim 4, wherein the processor is configured to:

for the first mode, control the display panel to be deactivated, and control so that a brightness of the display panel is darker than a brightness outside;
control to activate a partial area of the display panel corresponding to a partial area of the mirror in the first mode state; and
control so as to display a content on the partial area of the display panel.

8. The electronic device of claim 4, wherein the processor is configured to, for the second mode, control the display panel to be activated, and control so a brightness of the display panel is brighter than a brightness outside.

9. The electronic device of claim 4, wherein the processor is configured to selectively provide first mode
or the second mode based on situation recognition information collected for a predetermined period.

10. The electronic device of claim 4, wherein the processor is configured to selectively provide the first mode or the second mode based on a distance between the display and a user.

11. A method for operating an electronic device, the method comprising:

selectively providing a first mode which reflects or transmits light emitted by at least one external device in a deactivated state, or a second mode which displays a screen of a display in an activated state;
transmitting, to at least one external device configured to at least one of emit or adjust light radiated to the display, a request for emitting or transmitting a first amount of light by the at least one external device when the display provides the first mode; and
transmitting, to the at least one external device, a request for emitting or transmitting a second amount of light by the at least one external device when the display provides the second mode,
wherein the display is exposed to at least one of a first surface of the housing or a second surface opposite to the first surface,
wherein the display comprises a mirror configured to reflect or transmit light incident on the first surface from the at least one external device, and mirror shapes of external objects, and
wherein a front surface of the mirror is exposed to the first surface and a display panel disposed on or over a surface of the mirror which is opposite to the front surface of the mirror.

12. The method of claim 11, wherein further comprising:

detecting light intensity of light emitted by at least one light source on the surface of the mirror; and
outputting a control signal for adjusting an amount of light to be emitted by the at least one light source based on the detected light intensity.

13. The method of claim 11, wherein the selectively providing the first mode or the second mode comprises:

deactivating the display panel; and
providing the first mode so that a brightness of the display panel is darker than a brightness outside.

14. The method of claim 11, wherein the selectively providing the first mode or the second mode comprises:

activating the display panel; and
providing the second mode so that a brightness of the display panel is brighter than a brightness outside.

15. The method of claim 11, wherein further comprising:

activating a partial area of the display panel corresponding to a partial area of the mirror in a state of being switched to the first mode; and displaying a contents on the partial area of the display panel.

16. The method of claim 11, wherein the selectively providing the first mode or the second mode comprises switching to at least one of the first mode or the second mode based on at least one of a distance between the mirror and a user and situation recognition information collected for a predetermined period.

17. A non-transitory computer-readable recording medium having a program executed on a computer, wherein, when executed by a processor of an electronic device comprising a mirror and a display panel configured to project or reflect light, the program comprises executable instructions configured to cause the processor to control to:

selectively provide a first mode which reflects or transmits light emitted by at least one external device in a deactivated state, or a second mode which displays a screen of a display in an activated state; and transmit, to at least one external device configured to at least one of emit or adjust light radiated to the display, a request for emitting or transmitting a first amount of light by the at least one external device when the display provides the first mode; and transmitting, to the at least one external device, a request for emitting or transmitting a second amount of light by the at least one external device when the display provides the second mode, wherein the display is exposed to at least one of a first surface of the housing or a second surface opposite to the first surface, wherein the display comprises a mirror configured to reflect or transmit light incident on the first surface from the at least one external device, and mirror shapes of external objects, and wherein a front surface of the mirror is exposed to the first surface and a display panel is disposed on or over a surface of the mirror which is opposite to the front surface of the mirror.

\* \* \* \* \*